United States Patent [19]

Segal et al.

[11] Patent Number: 5,710,797
[45] Date of Patent: Jan. 20, 1998

[54] METHOD AND APPARATUS FOR DIGITAL COMMUNICATION IN THE PRESENCE OF CLOSELY SPACED ADJACENT CHANNELS

[75] Inventors: Mordechai Segal, Herzlia, Israel; Ofir Shalvi, Cambridge, Mass.

[73] Assignee: LIBIT Signal Processing Inc., Englewood Cliffs, N.J.

[21] Appl. No.: 447,410

[22] Filed: May 23, 1995

[51] Int. Cl.⁶ .................................................. H04L 27/06
[52] U.S. Cl. ............................................ 375/346; 375/349
[58] Field of Search ................................ 375/346, 349, 375/350, 260, 265, 254; 455/50.1, 52.3, 63

[56] References Cited

U.S. PATENT DOCUMENTS

| | | | |
|---|---|---|---|
| 5,363,407 | 11/1994 | Ramesh et al. | 375/254 |
| 5,430,894 | 7/1995 | Nohara et al. | 455/296 |
| 5,469,465 | 11/1995 | Birchler et al. | 375/346 |
| 5,537,443 | 7/1996 | Yoshimo et al. | 375/340 |

FOREIGN PATENT DOCUMENTS

| | | |
|---|---|---|
| 0360589 | 3/1990 | European Pat. Off. |
| 0453213 | 10/1991 | European Pat. Off. |
| 0550146 | 7/1993 | European Pat. Off. |
| 0637139 | 2/1995 | European Pat. Off. |

OTHER PUBLICATIONS

F Amoroso, "Pulse and Spectrum Manipulation in the Minimum (Frequency) Shift Keying (MSK) Format", *IEEE Transactions on Communications*, 381–384, (Mar. 1976).

O Andrisano, et al., "Adjacent Channel and Cochannel Interferences in CPFSK Systems with Nonlinear Transmitters and Limited–Discriminator Detection", *IEEE Transaction on Communications*, 36, 544–552, (May 1988).

O Andrisano, et al., "On the Spectral Efficiency of CPM Systems Over Real Channel in the Presence of Adjacent Channel and Cochannel Interference: A Comparison Between Partial and Full Response Systems", *IEEE Transactions on Vehicular Technology*, 39, 89–100, (May 1990).

N. Arne, et al., "Error Probability Analysis for Continuous Phase Modulation with Viterbi Detection on a Gaussian Channel with Multiple Signal Interference", *IEEE Transactions on Communications*, 37, 230–237, (1989).

(List continued on next page.)

*Primary Examiner*—Stephen Chin
*Assistant Examiner*—Kevim Kim
*Attorney, Agent, or Firm*—Schwegman, Lundberg, Woessner, & Kluth, P.A.

[57] ABSTRACT

A single transducer digital communication receiver is described which is capable of extracting the data bits of at least one desired signal in the presence of interfering signals of similar type. The present invention also seeks to provide a communication system in which overlapping transmissions are tolerated and allowed. The present invention describes a design for a digital communication system, according to a specific frequency plan, which includes an appropriate digital demodulator that extracts the data bits of the desired signal(s) in the presence of closely spaced signals. The present invention enables reduced channel spacing in digital communication systems and thereby increases the system capacity (i.e. the number of users per bandwidth unit) without incurring any significant loss in system performance (e.g. power margins, BER, and channel availability). It also allows a reduced power margin that is required to maintain a pre-specified performance level without sacrificing system capacity. These two factors, power margin and system capacity, play a central role in the design and construction of state-of-the-art digital communication systems which seek to pack more users on the same frequency band without incurring significant power loss. Thus, the present invention also provides a method and apparatus for upgrading existing systems such as a cellular system for mobile wireless communications that is based on the IS-54 or the GSM standard.

32 Claims, 18 Drawing Sheets

OTHER PUBLICATIONS

S Arne, "Improved Error Probability Analysis for CPM with Linear Detection on Gaussian and Rayleigh Fading Channels with interfering Signals", *Technical Report TR–204*, 1–61, (Jan. 16, 1987).

R E Eaves, et al., "Optimization of Quadrature–Carrier Modulation for Low Crosstalk and Close Packing of Users", *IEEE Transactions on Communications, COM–27*, 176–185, (Jan. 1979).

S A Gronemeyer, et al., "MSK and Offset QPSK Modulation", *IEEE Transactions on Communications, COM–24*, 809–820, (Aug. 1976).

I Kalet, "A Look at Crosstalk in Quadrature–Carrier Modulation Systems", *IEEE Transactions on Communications, COM–25*, 884–892, (Sep. 1977).

I Kalet, "Adjacent Channel Interference in Continuous Phase Modulation (CPM)", 1–36.

I Kalet, et al., "Suboptimal Continuous Shift Keyed (CSK) Demodulation for The Efficient Implementation of Low Crosstalk Data Communication", *IEEE Transactions on Communications, COM–25*, 1037–1041, (Sep. 1977).

I Korn, "Simple Expression for Interchannel and Intersymbol Interference Degradation in MSK Systems with Application to Systems with Gaussian Filters", *IEEE Transactions on Communications, COM–30*, 1968–1972, (Aug. 1982).

D H Morais, et al., "Bandwidth Efficiency and Probability of Error Performance of MSK and Offset QPSK Systems", *IEEE Transactions on Communications, COM–27*, 1794–1801, (Dec. 1979).

D H Morais, et al., "The Effects of Filtering and Limited on the Performance of QPSK, Offset QPSK, and MSK Systems", *IEEE Transactions on Communications, COM–28*, 1999–1981 (Dec. 1980).

S. Pasupathy, "Minimum Shift Keying: A Spectrally Efficient Modulation, Compact Power Spectrum, Good Error Rate Performance, and Easy Synchronization Make MSK an Attractive Digital Modulation Technique", *IEEE Communications Magazine*, 14–22, (Jul. 1979).

B R Petersen, et al., "Suppression of Adjacent–Channel, Cochannel, and Intersymbol Interface by Equalizer and Linear Combiners", *IEEE Transactions on Communications, 42*, 3109–3118, (Dec. 1994).

M Rabzel, et al., "Spectral Shaping in Minimum Shift Keying (MSK)–Type Signals", *IEEE Transactions on Communications, COM–26,*, 189–195, (Jan. 1978).

B Reiffen, et al., "On Low Crosstalk Data Communication and its Realization by Continuous–Frequency Modulation Schemes", *IEEE Transactions on Communications, COM–26*, 131–135, (Jan. 1978).

R B Rhodes, Jr., et al., "MSK–Type Reception of Continuous Phase Modualation: Cochannel and Adjacent Channel Interference", *IEEE Transactions on Communications, COM–35*, 185–193, (Feb 1987).

M K Simon, "A Generalizatin of Minimum–Shift–Keying (MSK)–Type Signaling Based Upon Input Data Symbol Pulse Shaping", *IEEE Transactions on Communications, COM–24*, 845–856 (Aug. 1976).

V Varma, et al., "Adjacent Channel Interference in Partial Response Continuous Phase Modulatin Systems with MSK––Type Receivers", 5 pages.

V Varma, et al., "Error Performance of Partial Response CPM in the Presence of Adjacent Channel Interference and Gaussian Noise", *IEEE, 31.4* 1–31.4.5, (1986).

V Varma, et al., "Performance of Partial Response CPM in the Presence of Adjacent Channel Interference and Gaussian Noise", *IEEE Transactions on Communications, COM–34*, 1123–1131, (Nov. 1986).

B E White, "A Worst–Case Comparison Among Several Modulation Schemes", *IEEE Transactions on Communications, COM–25*, 1032–1040, (Sep. 1977).

to detection and tracking unit (Fig. 13)

to cluster processor(s) (Fig. 16)

METHOD AND APPARATUS FOR DIGITAL COMMUNICATION IN THE PRESENCE OF CLOSELY SPACED ADJACENT CHANNELS

FIELD OF THE INVENTION

The present invention relates to communication methods and systems.

BACKGROUND OF THE INVENTION

In the prior art, digital communication systems are designed using a conventional receiver, based on the optimal configuration for a single signal in the presence of additive Gaussian noise, for example, using a matched filter detector or its variants. In such a case, the frequency spacing between adjacent channels must be sufficiently large to prevent substantial overlapping between adjacent transmissions. Otherwise, if the spacing between adjacent channels is too small, the performance of the conventional receivers will be significantly degraded due to the severe adjacent channel interference. This is a common problem in allocating the frequency spectrum to avoid adjacent channel interference and yet maximize the available channels in the frequency spectrum.

The present invention seeks to provide method and apparatus for extracting the data bits of a digital communication signal in the presence of severe adjacent channel interference. Consequently, the present invention allows one to increase system capacity by increasing the number of users per bandwidth unit without reducing the quality of the transmission. The present invention also allows a reduction in the channel spacing below the conventionally used channel spacing without incurring any significant loss in system performance. Nevertheless, the present invention can be implemented using resources that are comparable to the implementation of the conventional receivers.

SUMMARY OF THE INVENTION

The present invention solves the above-mentioned problems with the prior art and other problems which will be understood by those skilled in the art upon reading and understanding the present specification. The present invention describes a single transducer digital communication receiver which is capable of extracting the data bits of at least one desired signal in the presence of interfering signals of similar type. The present invention also seeks to provide a communication system in which overlapping transmissions are tolerated and allowed. The present invention describes a design for a digital communication system, according to a specific frequency plan, which includes an appropriate digital demodulator that extracts the data bits of the desired signal(s) in the presence of closely spaced signals.

The present invention enables reduced channel spacing in digital communication systems and thereby increases the system capacity (i.e. the number of users per bandwidth unit) without incurring any significant loss in system performance (e.g. power margins, BER, and channel availability). It also allows a reduced power margin that is required to maintain a pre-specified perforce level without sacrificing system capacity. These two factors, power margin and system capacity, play a central role in the design and construction of state-of-the-art digital communication systems which seek to pack more users on the same frequency band without incurring significant power loss. Thus, the present invention also provides a method and apparatus for upgrading existing systems such as a cellular system for mobile wireless communications that is based on the IS-54 or the GSM standard. The present invention also allows an increase in bandwidth of existing channels to increase the data throughput per user without increasing the total bandwidth or the number of channels in the system.

BRIEF DESCRIPTION OF THE DRAWINGS

In the drawings, where like numerals refer to like components throughout the several views.

DETAILED DESCRIPTION OF PREFERRED EMBODIMENTS

In the following detailed description of the preferred embodiment, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

Figure 1:
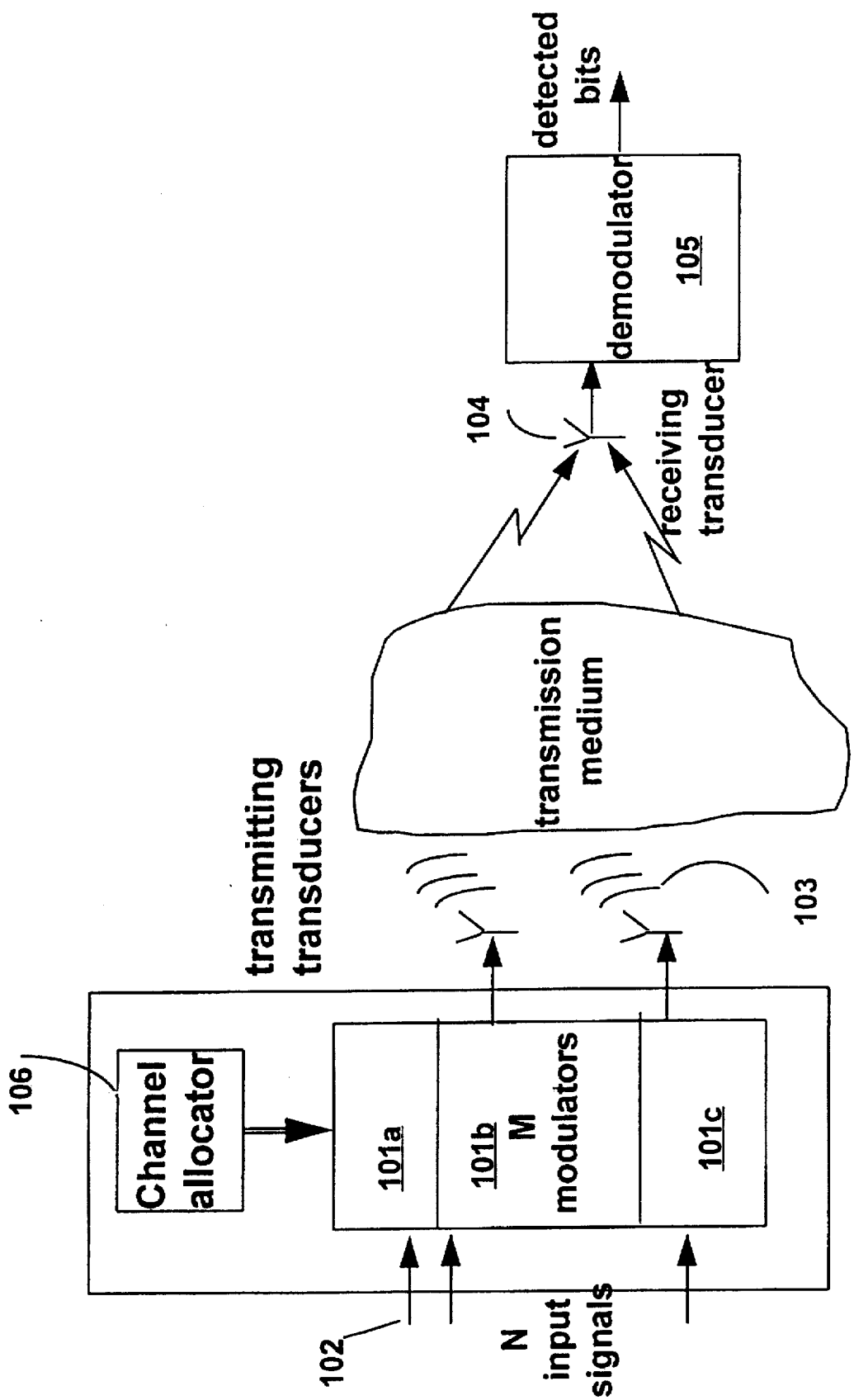
FIG. 1 is a simplified block diagram of digital communications apparatus constructed and operative in accordance with a preferred embodiment of the present invention.

Reference is now made to FIG. 1 which is a simplified block diagram of a communications apparatus constructed and operative in accordance with a preferred embodiment of the present invention. The apparatus of FIG. 1 includes M≧1 transmitters 101a, 101b, 101c, etc. that transmit a plurality of N digital communication signals 102. The transmitted signals 103 are partially overlapped in frequency, and may be fully overlapped in time, in polarity, and in space.

The apparatus of FIG. 1 also includes a single receiving transducer 104. The transducer receives a sum of the M transmitted signals 103, in which each signal may have undergone different transmitter and channel impairments. One or more of the signals are designated as the desired signal of the particular receiver. The demodulator 105 of FIG. 1 includes various units that may operate in an iterative and recursive manner to finally provide the estimated data bits of the desired signal(s).

Also provided is a master channel allocator which is operative to allocate channels to the individual users, typically in response to a request-to-transmit from a specific user.

Figure 2:
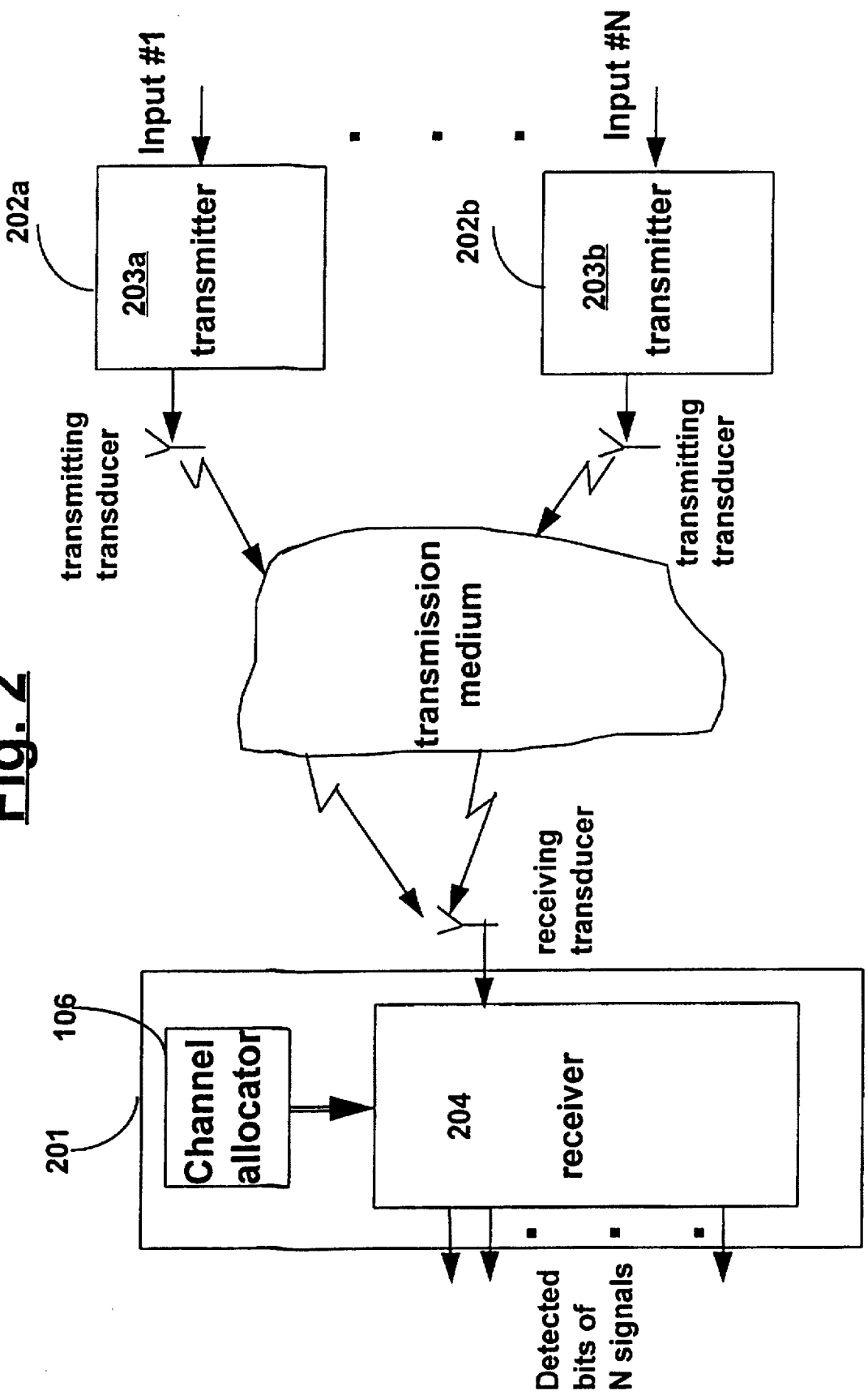
FIG. 2 is a simplified block diagram of digital communications apparatus constructed and operative in accordance with another preferred embodiment of the present invention.

In the context of cellular communication system, the apparatus of FIG. 2 may represent the downlink transmission (from the base station 201 to the mobile users 202a, 202b, etc.), in which the transmitters 101a, 101b, 101c, etc. are located within the frame (border) of a single base station 201 or several base stations, and the mobile user 202a, 202b, etc. uses a single antenna terminal. It may also represent the uplink direction, in which case M=N, and each transmitter 203a, 203b, etc. transmits a single message that may at least partially overlap in frequency to other transmissions. Each transmitter 203a, 203b, etc. corresponds to a single mobile user 202a, 202b, etc., and the single transducer receiver 204 is located at a base station 201, where all the signals are processed to extract the data bits of all users.

The present invention can be used to increase the number of users per cell in a IS-54 cellular communication system. The IS-54 standard is described in the document EIA/TIA/IS-54-A (revision of EIA/TIA/IS-54), "Cellular System Dual-Mode Mobile Station-Base Station Compatibility Standard", March 1991, which is hereby incorporated by reference. The communication system consists of mobile stations and base stations. The air interface consists of a physical layer, and protocol layers. The modulation format is pi/4-QPSK, the transmission format is TDMA (time division multiple access), and the fame format is defined in the aforementioned document EIA/TIA/IS-54-A.

The present invention seeks to reduce the spacing between adjacent channels. In prior art, the channel spacing has been reduced to a value for which a conventional matched filter receiver could operate with tolerable power margin loss. Thus, in the IS-54 standard each of the stations transmits 24300 symbols/sec while the channel spacing is 30 KHz.

Figure 3:
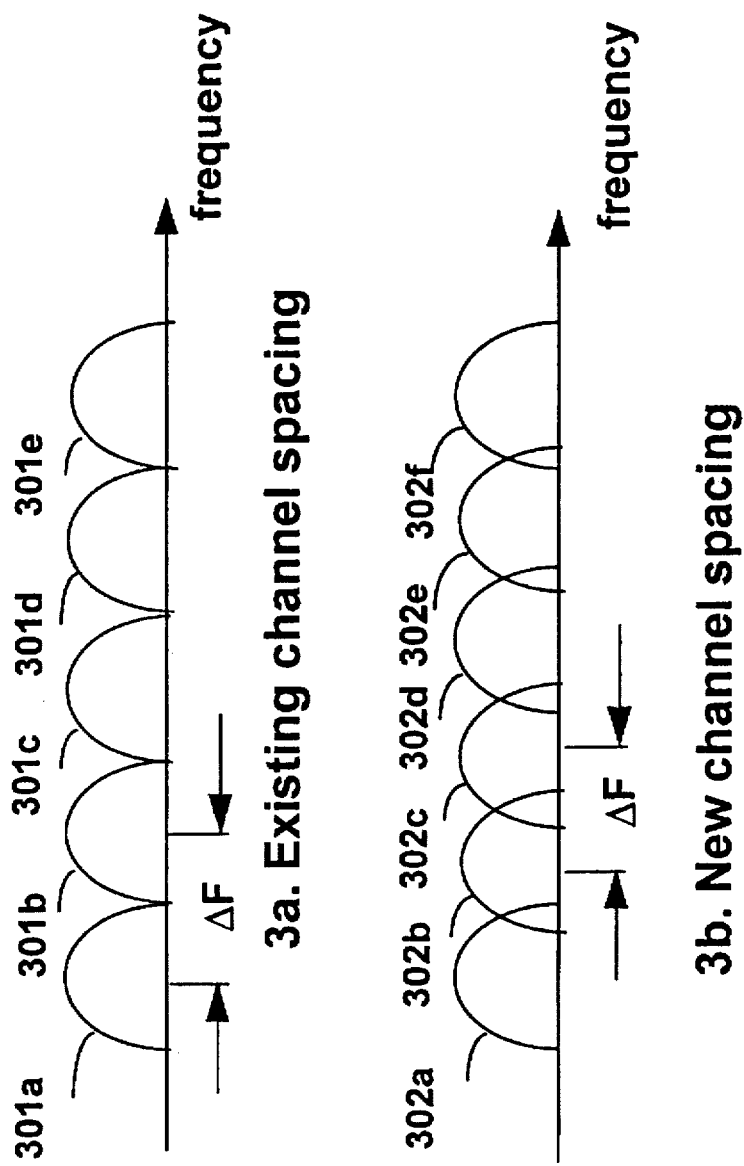
FIG. 3a is an illustration of conventional frequency grid that is currently employed in cellular systems.
FIG. 3b illustrates a frequency grid that can be used in accordance with the present invention.

FIG. 3a illustrates a frequency allocation scheme that is currently employed in the IS-54 system, with channel spacing of ΔF=30 KHz between adjacent signals 301a, 301b, 301c, 301d, 301e, etc. In view of the present invention the channel spacing between adjacent channels 302a, 302b, 302c, 302d, 302e, 302f, etc. is reduced to ΔF=25 KHz, rather than the nominal value of ΔF=30 KHz, as illustrated in FIG. 3b. Those skilled in the art will readily recognize that the present invention may operate with ΔF reduced even more without departing from the spirit and the scope of the present invention. For example, with ΔF=20 KHz, the present invention will operate with some reduced performance.

Figure 4:
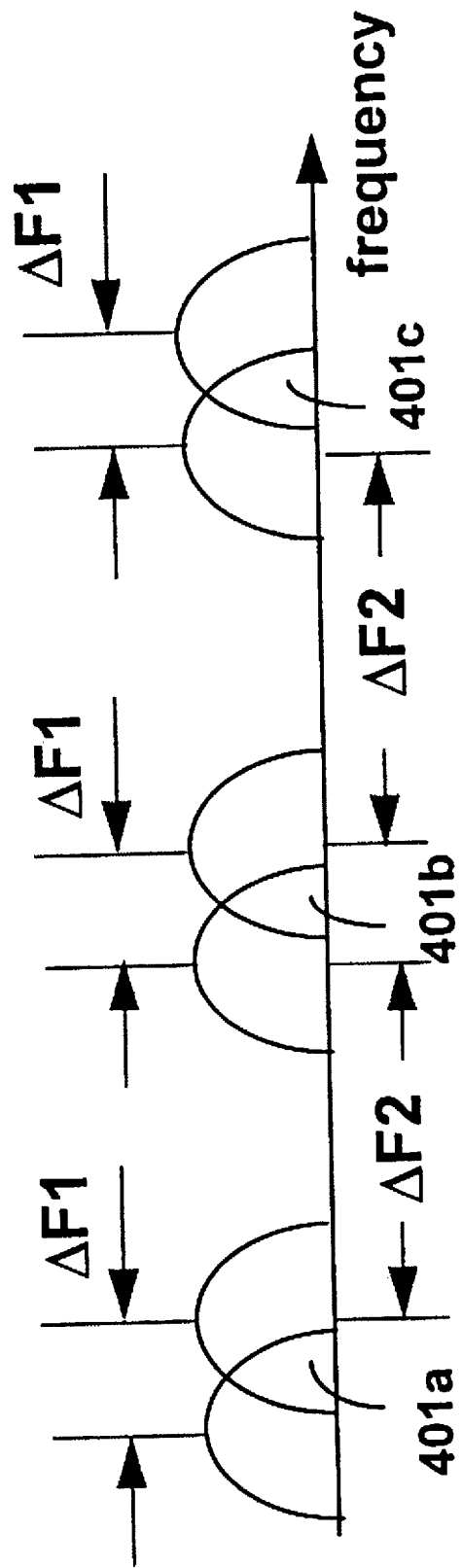
FIG. 4 illustrates another frequency grid that can be used in accordance with the present invention.

Alteratively, frequency allocation may be in accordance with any reduced spacing frequency grid such as but not limited to the non-uniform frequency grid shown in FIG. 4, with channel spacings ΔF1 and ΔF2. In this figure there are pairs of signals 401a, 401b, 401c, etc., and the pairs are isolated from each other. For IS-54-like systems, ΔF1 may be set to 20 KHz, while ΔF2 may be set to 30 KHz.

Figure 5:
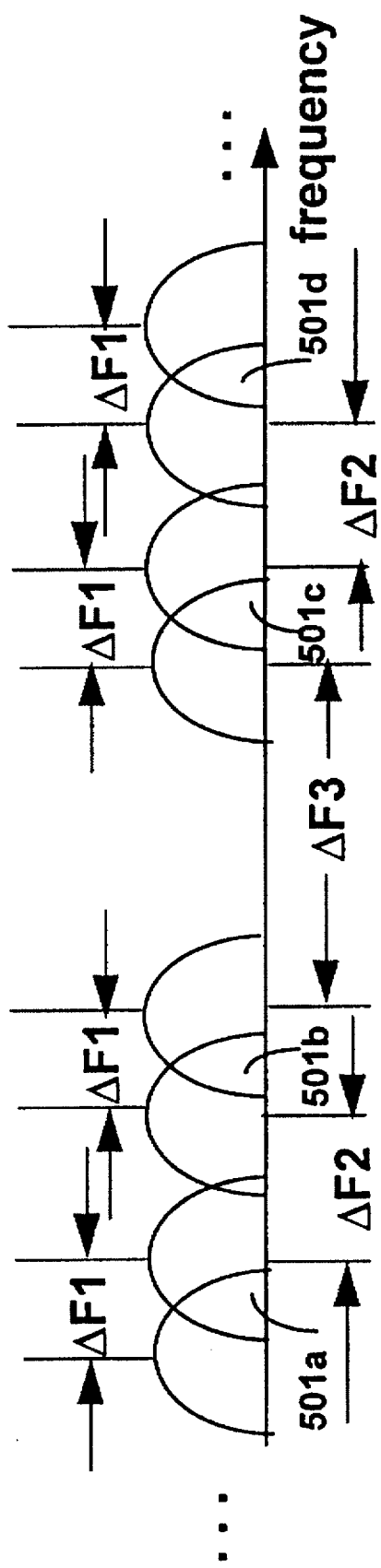
FIG. 5 illustrates another frequency grid that can be used in accordance with the present invention.
Figure 6:
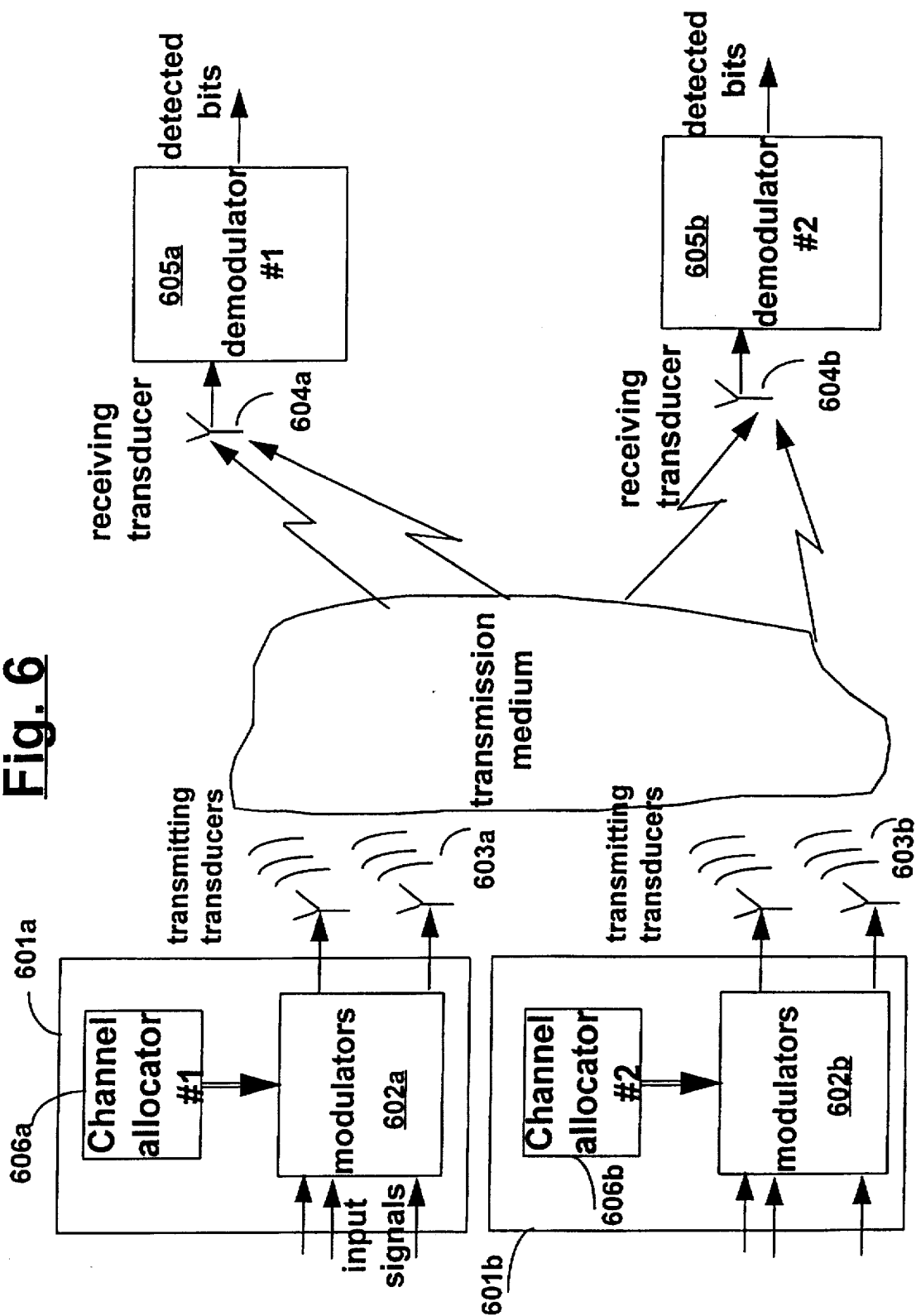
FIG. 6 is a simplified block diagram of digital communication apparatus constructed and operative in accordance with another preferred embodiment of the present invention.
Figure 7:
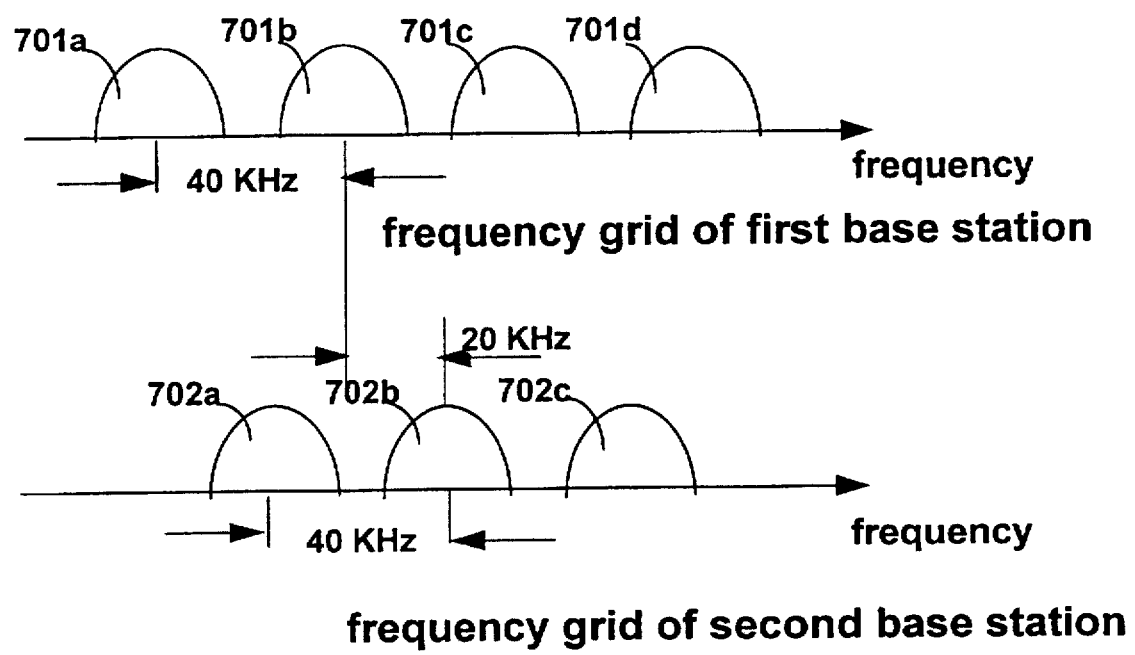
FIG. 7 illustrates the frequency plan for the specific embodiment of FIG. 6.

FIG. 5 illustrates another non-uniform frequency grid, in which the pairs of signals 501a, 501b, 501c, 501d, etc. are overlapped between themselves. A suitable channel spacing setting for IS-54-like systems may be ΔF1=20 KHz, ΔF2=25 KHz, and ΔF3=30 KHz. One may add additional base stations 601b in a specific cell in addition to the original base station 601a, as illustrated in FIG. 6. This figure also shows the modulators 602a and 602b, the transmitting transducers 603a and 603b, the receiving transducers 604a and 604b, the single transducer receivers 605a and 605b, and the channel allocators 606a and 606b. Suppose that the frequency bands associated with each base station are uniformly spaced. The frequency allocation scheme for the two base stations 601a and 601b is illustrated in FIG. 7, with channel spacing between adjacent channels 701a, 701b, 701c, 701d, etc., 702a, 702b, 702c, etc. (for IS-54-like systems) of 40 Khz for both base stations. The spacing between the channels of the first base station to the channels of the new base station is 20 KHz. Beside the difference in the grid of carrier frequencies the communication is performed identically in the two base stations 601a and 602b.

Figure 8:
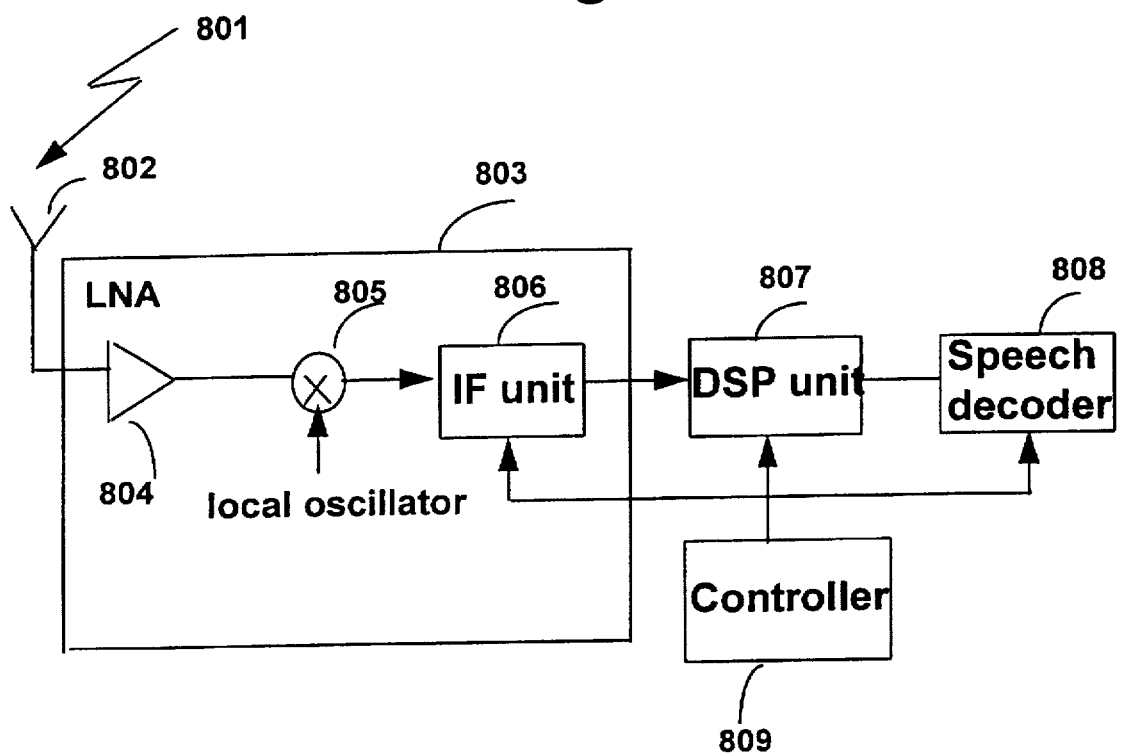
FIG. 8 is a simplified block diagram of the demodulator of FIG. 1 in the context of the specific embodiment built around the IS-54 standard with a modified frequency grid, FIG. 9 contains a high-level description of the processes that take place in the DSP unit of FIG. 6, FIG. 10A and 10B are flow charts describing the initialization process.

Reference is now made to FIG. 8 which is a simplified block diagram of the demodulator of FIG. 1 in the context of the specific embodiment built around IS-54-like systems with a modified frequency grid. The input signal 801 to the demodulator consists of a sum of M digital communication signals, possibly distorted with unknown parameters. One or more of the M signals or part of them are designated as the desired signal for the specific demodulator.

The demodulator consists of an antenna 802, an analog front end unit 803 which amplifies the antenna output using a Low Noise Amplifier (LNA) 804; a down converter unit 805 that converts it from RF frequencies to low IF frequencies where the center frequency of the desired signal is 65 KHz; an IF unit 806; a DSP unit 807 which detects the transmitted data; a speech decoder unit 808 which synthesizes a speech signal based on the DSP unit output; and a controller unit 809 which controls the other units in accordance with protocol layer messages transmitted in a control channel and according to inputs from the user (such as dialing). All these units, beside the DSP unit 807, are similar to the corresponding units in a conventional IS-54 receiver.

Figure 9:
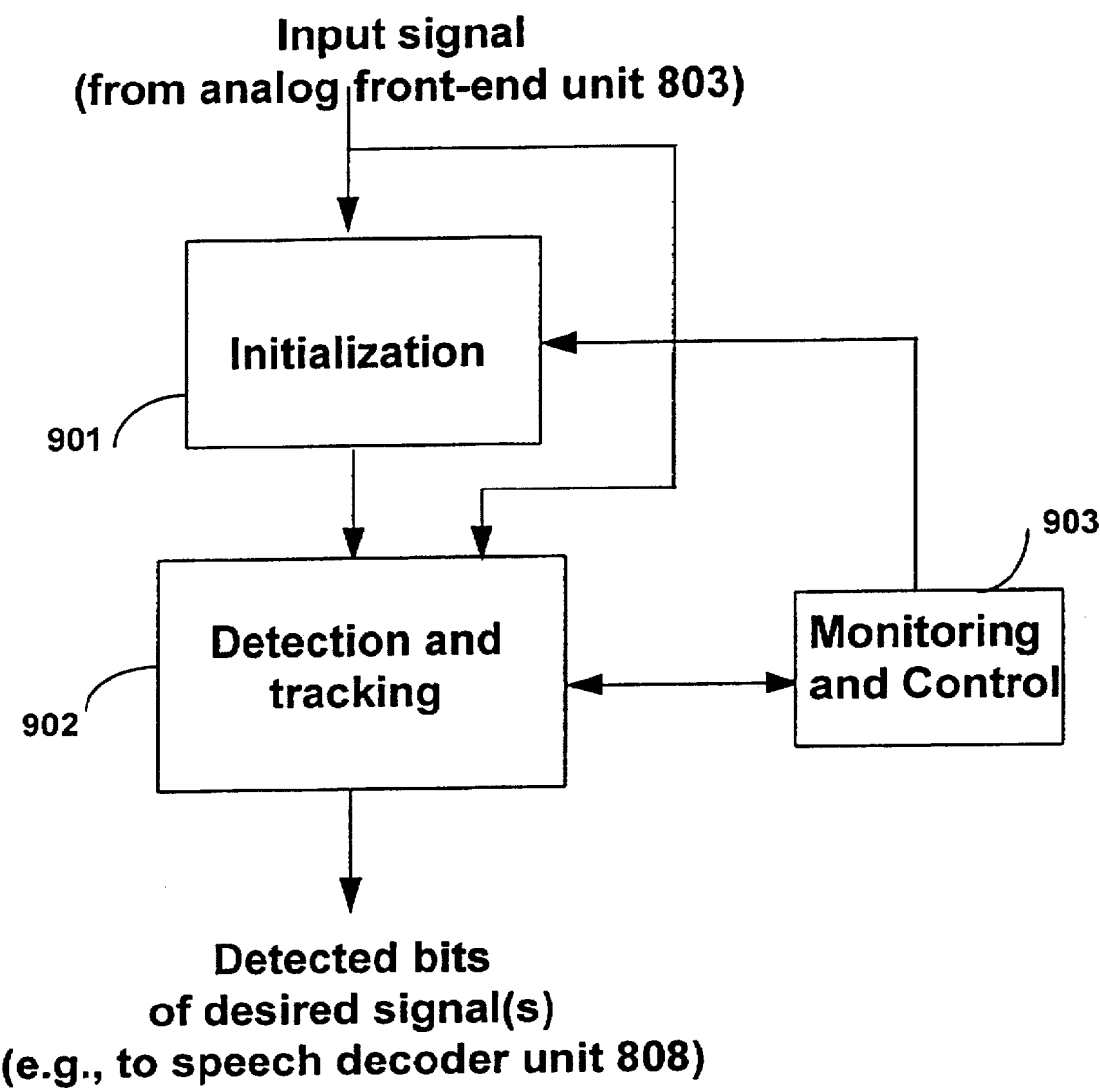

FIG. 9 contains a high-level description of the processes that take place in the DSP unit 807. The various processes are outlined below:

1. Initialization process 901: During the initialization phase the receiver is tuned to the desired channel(s), detects the appearance of the desired signal(s), and acquires the unknown parameters associated with it (e.g., carrier frequency, timing, complex amplitudes, and possibly the channel impulse response in selective fading scenarios). It also detects the presence of adjacent channel signals, and extracts their relevant parameters. In addition, it also divides the desired signals and the interfering signals into clusters of closely spaced signals, which are then processed in separate units to extract the data bits, and to track the variations in the signal parameters. The acquisition process remains operative if new signals appear at the receiver input, or due to e.g. blocking effects, voice activation. This information comes from the monitoring and control process (see below).

2. Detection and tracking process 902: This is the regular operation mode in which the receiver extracts the information bits of the desired signal(s), and tracks the variations in the parameters of all the signals within the receiver bandwidth. According to the changes in parameters value and inputs from the monitoring and control process (see below), it may change its internal structure and method of detection and tracking.

3. Monitoring and control process 903: The receiver monitors all the relevant signals, including the desired signal(s) as well as the adjacent channel signals, and makes decisions as whether signals disappear and/or new signals appear at the receiver input (e.g., due to blocking effects or due to voice activation and power control mechanisms in cellular communications). The control process informs the other processes 901, 902 in case of changes.

The present invention is described below in the context of the IS-54, in which data are processed in a block mode, one TDMA slot at a time. We also assume here a flat fading situation. The invention can be applied in a continuous mode of operation (e.g., in FDMA-based systems) and can be applied to time dispersive channels.

Figure 10A:
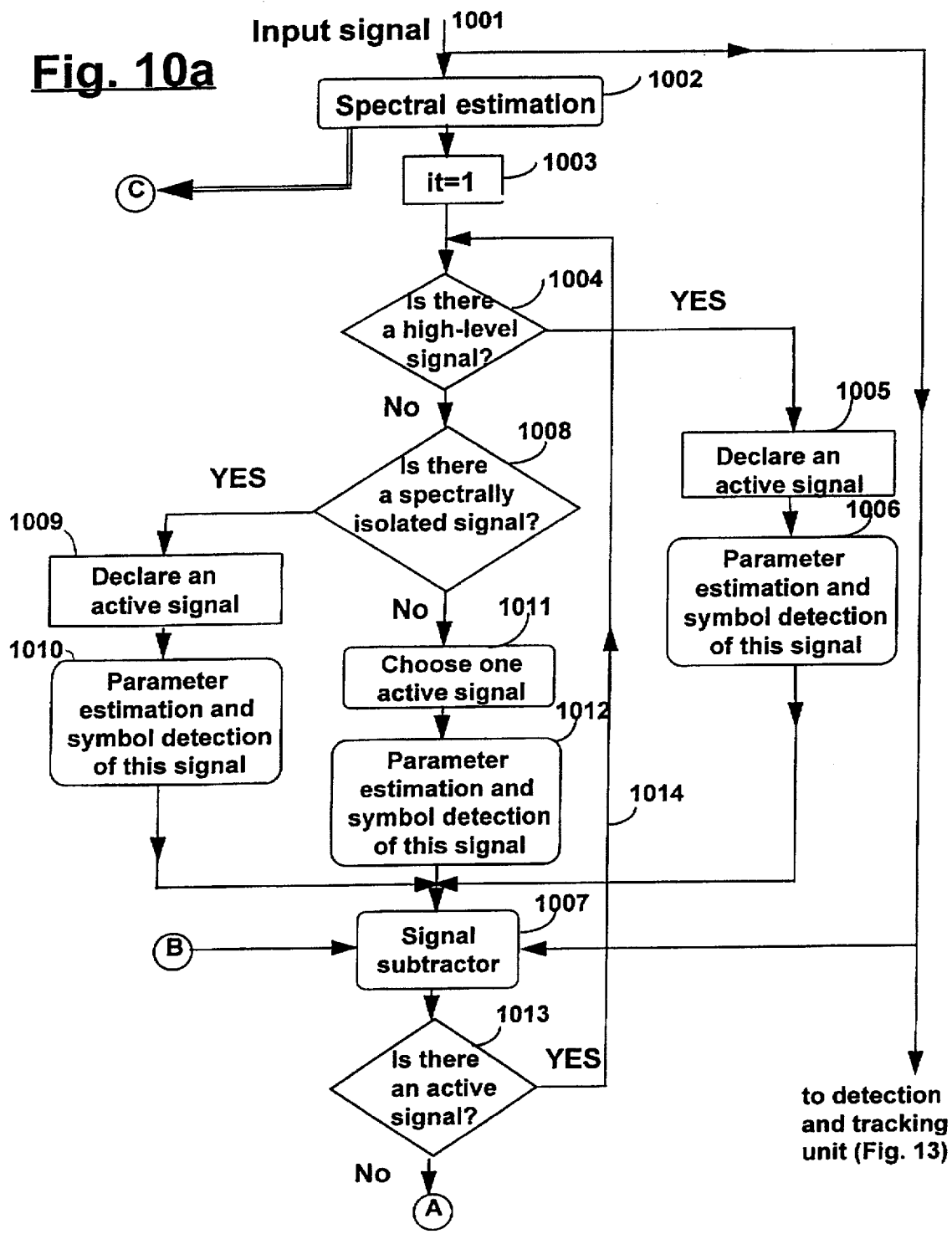
Figure 10B:
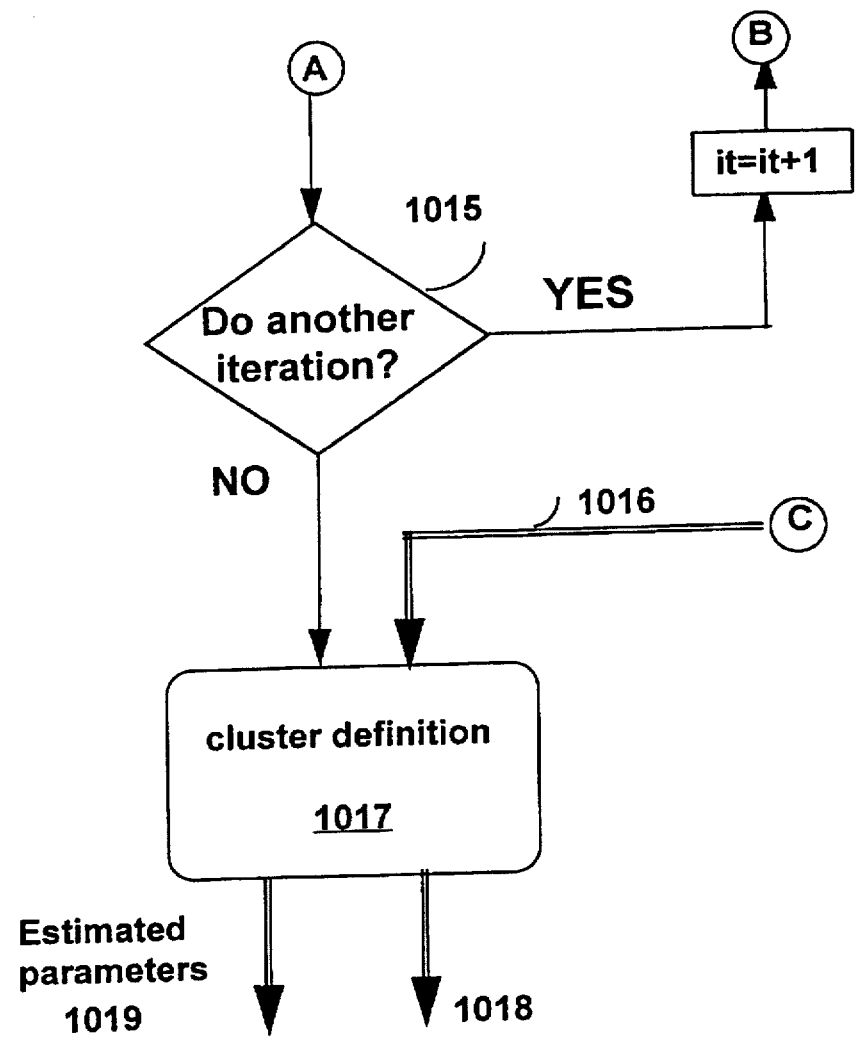
Figure 11:
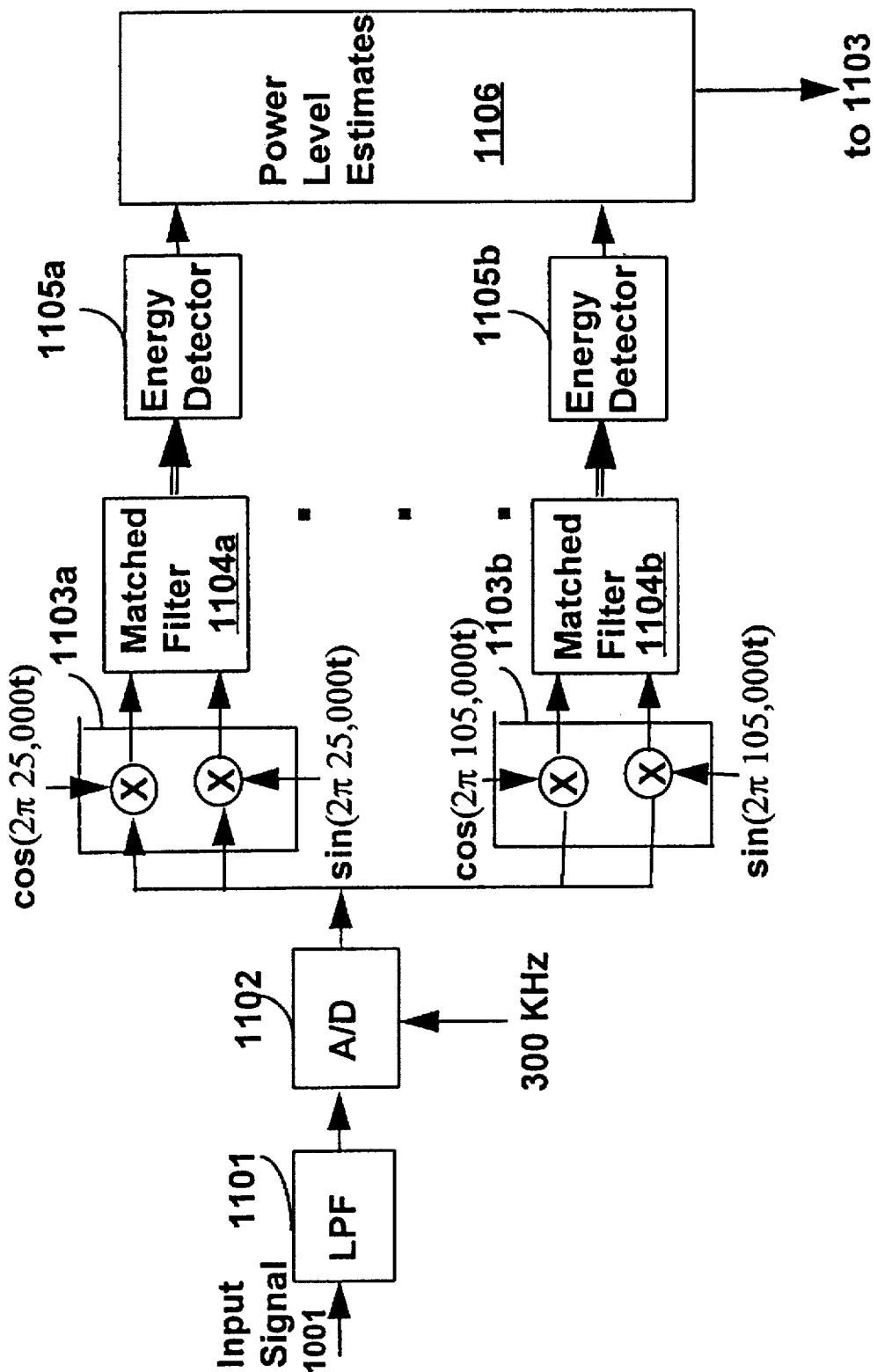
FIG. 11 shows the spectral analyzer stage of FIG. 10 in the specific embodiment of the modified IS-54 demodulator.

FIGS. 10a and 10b are flow charts describing the initialization process 901. An input signal 1001 entering the DSP unit from the analog front-end unit is first passed through a spectral analyzer 1002 to detect the appearance of the desired signal(s), and simultaneously detects the presence and strength of adjacent channel signals. FIG. 11 shows the spectral analyzer stage 1002 in the specific embodiment of the modified IS-54 demodulator. The output of the analog front end unit is low pass filtered by a low pass filter 1101 to 150 KHz and sampled in an analog-to-digital (A/D) converter 1102. The sampling rate of the A/D 1102 is 300000 samples per second. The A/D output is then multiplied by 5 sine and cosine sequences 1103a, 1103b, etc., at the frequencies which correspond to the carrier frequencies of the desired signal, its two right hand adjacent signals, and its two left hand adjacent signals (that is 25 KHz, 45 KHz, 65 KHz, 85 KHz and 105 KHz—in case of 20 KHz channel spacing). All these 5 demodulated signals are then passed through a square-root raised cosine filter 1104a, 1104b, etc., with a roll-off factor of 35% and a 3 dB bandwidth of 24300 Hertz. The energies of the 5 filter outputs are estimated in energy detector units 1105a, 1105b, etc. (e.g. by squaring the signals and then low pass filtering). Based on the estimated energies, the DSP unit 807 estimates 1106 the power levels of the desired signal and its 4 nearest adjacent signals. This can be done e.g., by subtracting the estimated noise contribution from the estimated energies and then multiplying by a 5×5 matrix whose elements depends on the frequency spacing and pulse shaping.

Reference is now made back to FIG. 10. The estimated power levels of the signals are then used to define the sequence in which signals are processed in order to initially extract their parameters. The iteration index is set to 1 (1003). If there exists a signal whose estimated power level is larger than its neighbors by a pre specified factor (1004), the receiver declares it as an active signal (1005), and extracts (1006) its parameters and data bits first according to FIG. 12, and then reconstructs the signal 1001 and subtracts it from the input signal at the signal subtractor sub-unit 1007. This process is then repeated on the subtracted signal. If the subtracted signal does not contain a dominant signal (1004), whose estimated power level is larger by a pre specified factor than the other signals, the receiver seeks 1008 for a spectrally isolated signal. If such exists, it declares it as an active signal (1009), extracts (1010) its parameters and data bits according to FIG. 12, and subtracts the reconstructed signal from the previous subtracted signal 1007. If there is neither a dominant signal nor a spectrally isolated signal, the receiver chooses one signal 1011, extracts (1012) its parameters and data bits according to FIG. 12, reconstructs the signal, and subtracts it in the signal subtractor sub-unit 1007. The receiver then scans (1013) the subtracted signal in order to detect more active signals. The whole process is repeated 1014 until all active signals whose power level exceed a certain threshold level are processed. All other signals are considered as inactive and thus can be ignored.

The process may be iterated several times 1015 by treating one signal at a time, where all other signals are reconstructed at the signal subtractor sub-unit 1007 and are subtracted from the input signal 1001 using the most updated parameter and data bit sequence estimates. The decision whether to do another iteration or to cease the initialization process may depend on several factors. For example, it is possible to determine the number of iterations before hand based on the estimated signal power levels, the frequency spacing and the signal-to-additive noise level.

Figure 12:
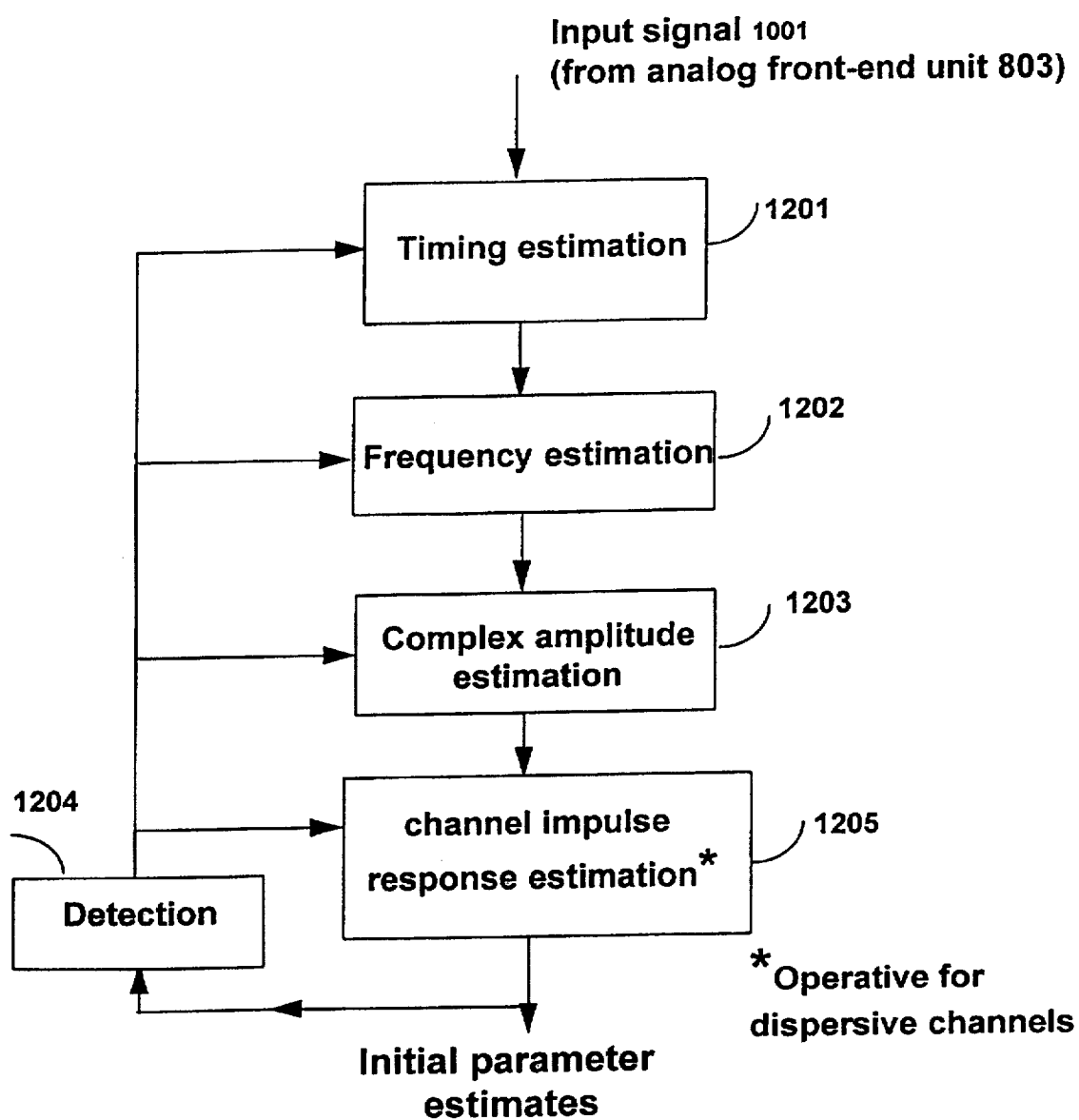
FIG. 12 shows the stages of the acquisition and data detection process of one signal during the initialization phase in the presence of other interfering signals.

FIG. 12 shows a possible sequence of operations that may be used to extract the signal parameters. We assume here that the symbol clock error is only few pulse-per-million (ppm). The first stage then is to generate a timing reference 1201. A possible approach is to correlate the received signal against a known sequence that is stored in the receiver. In an IS-54 flame structure one can use for the initialization process the known 14 bits SYNC word, defined in section 1.2.4 of the aforementioned document EIA/TIA/IS-54-A, and possibly also the CDVCC sequence defined in section 1.2.5 of the aforementioned document EIA/TIA/IS-54-A, if it is known a-priori, and the SYNC word of the next time slot. The correlation is done for possibly a number of frequency offset values using a stored data sequence generated on a grid of possible carrier frequency offsets.

The timing reference is then used to extract a frequency estimate 1202 and a complex amplitude estimate 1203. One possible way is to use an FFT analysis, or chirp-FFT. More accurate initial estimates, if needed, can be obtained by using the detected bits in a decision-directed mode of operation as shown schematically 1204 in FIG. 12. The training data can also be used to adjust 1205 a short equalizer or to obtain an estimate of the channel parameters. If more data are needed, one may adapt the equalizer or the channel estimator in a decision directed mode 1204 using the detected bits of the signal.

Reference is now made back to FIG. 10. The estimated power levels 1016 of all the active signals that are present in the input signal are then used to define the signal clusters 1017. For example, a signal that is stronger than its neighbor signals by more than a given threshold will be on a cluster by its own; neighboring signals which have similar power levels will be on the same cluster.

Figure 13:
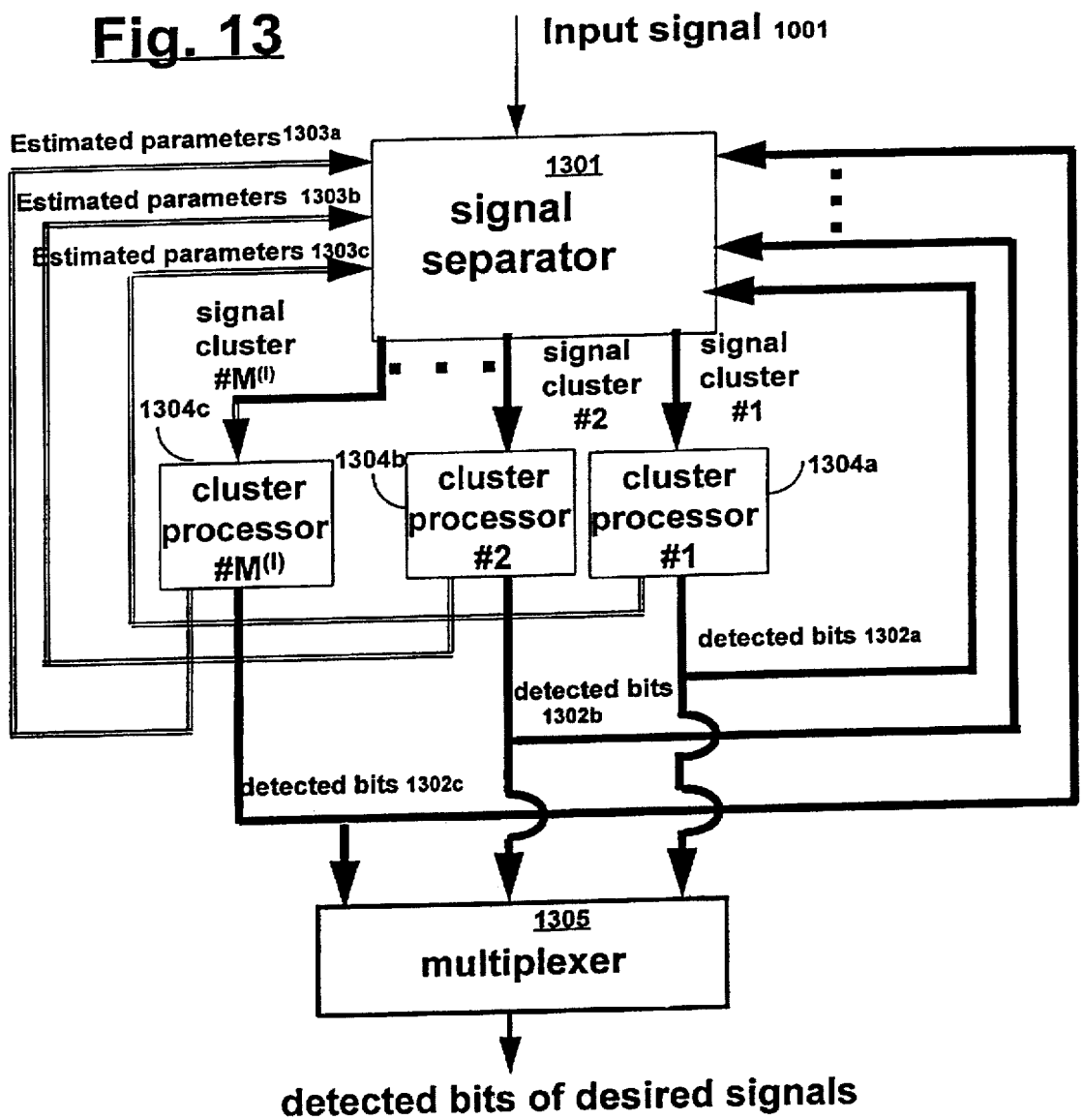
FIG. 13 illustrates the main structure of the detection and tracking unit.

The input signal 1001 jointly with the definition of signal clusters 1018 and the estimated parameters 1019 are then fed to the detection and tracking unit (see FIG. 13).

The detection of the data bits of the desired channel(s) shall be done in accordance with FIGS. 13, 15–17. FIG. 13 illustrates the main structure of the detection and tracking unit 902. It consists of the following sub-units:

1. Signal Separator 1301 subtracts the reconstructed adjacent signal clusters using the detected bits 1302a, 1302b, 1302c, etc. and the estimated parameters 1303a, 1303b, 1303c, etc. that come from the cluster processing units, and, if needed, update the parameter estimates of all the active signals.
2. Cluster Processors 1304a, 1304b, 1304c, etc. detect the data bits and tracks the parameters of a cluster of signals.
3. Multiplexer 1306 selects the desired bits into an output buffer.

In the specific embodiment constructed around the frequency grid of FIG. 4, the detection and tracking unit 902 is constructed according to the following. The communication apparatus includes a receiver which operates such that on the first iteration cycle the input signal 1001 is fed into a single two-signal cluster processor 1304a, 1304b (i.e., $M^{(1)}=1$ in FIG. 13, and $K_1^{(1)}=2$ in FIG. 16), which detects the information bits of the desired signal by jointly detecting the bits of the desired signals and the dominant adjacent channel interference, and by estimating and tracking the variations in the parameters of both signals. On the next iteration cycle, if needed and performed, the signal processing unit 807 operates on the detected information bits 1302a, 1302b and the estimated parameters 1303a, 1303b from the first iteration cycle. First, they are fed back to the signal separator unit 1301 where the interfering signal is reconstructed 1502 and subtracted from the input signal 1001. The subtracted signal is then fed to a single one-signal cluster processor 1304a (i.e., $M^{(2)}=1$ in FIG. 13, and $K_1^{(2)}=1$ in FIG. 16) to re-detect the information bits of the desired signal, and re-estimate its parameters. On the next iteration cycle, if needed and performed, the detected information bits 1302a and the estimated parameters 1303a from the last iteration cycle are fed back to the signal separator unit 1301 where the desired signal is reconstructed 1502 and subtracted from the input signal 1001. The subtracted signal is then fed to a single one-signal cluster processor 1304a (i.e., $M^{(3)}=1$ in FIG. 13, and $K_1^{(3)}=1$ in FIG. 16) which detects the information bits of the dominant interfering signal, and estimates its parameters. The detected information bits 1302a and the estimated parameters 1302b are then fed back to the signal separator unit where the interfering signal is reconstructed 1502 and subtracted from the input signal. The subtracted signal is then fed to a single one-signal cluster processor 1304a (i.e., $M^{(3)}=1$ in FIG. 13, and $K_1^{(3)}=1$ in FIG. 16) to provide the estimated information bits 1302a of the desired signal, jointly with estimates 1303a of its parameters. Additional iteration pairs, like the previous one may also be performed.

Also, if the signal(s) are non-linearly distorted, the signal can be reconstructed at the signal separator unit 1301 with the exact or estimated nonlinearity. Alteratively, the non-linearity can be inserted at the cluster processing units 1304a, 1304b, 1304c, etc. Also, if the signal(s) are coded, the decoding can be performed at the signal separator unit 1301 on the estimated signal after subtraction of the interfering signal, or it can be done at the cluster processor units 1304a, 1304b, 1304c, etc.

In the specific embodiment constructed around the frequency grid of FIG. 5, the detection and tracking unit 902 is constructed according to the following. The communication apparatus is constructed and operated such that on the first iteration cycle the input signal 1001 is fed into two two-signal cluster processors 1304a, 1304b (i.e. $M^{(1)}=2$ in FIG. 13, and $K_1^{(1)}=K_2^{(1)}=2$ in FIG. 16), each of which detects the information bits of the corresponding pair of signals, and tracks the variations in the parameters of both signals. Each cluster processor operates according to the above description, where the signal separator 1301 and the cluster processor 1304a, 1304b are substituted by a sub-signal separator unit and by a sub-cluster processor unit, respectively. The detected information bits 1302a, 1302b and the estimated parameters 1303a, 1303b of both clusters are then fed back to the signal separator unit 1301 where one of the clusters (e.g., the one that does not contain the desired signal) is reconstructed 1502 and subtracted from the input signal 1001. The subtracted signal is then fed back to a single two-signal cluster processor 1304a (i.e., $M^{(2)}=1$ in FIG. 13, and $K_1^{(2)}=2$ in FIG. 16) which estimates and tracks the parameters, and provides the estimated information bits of the second signal pair. On the next iteration cycle, if performed, the detected information bits 1302a and the estimated parameters 1303a from the first iteration cycle are fed back to the signal separator unit where the second signal cluster is reconstructed 1502 and subtracted from the input signal 1001. The subtracted signal is fed to a single two-signal cluster processor 1304a (i.e., $M^{(3)}=1$ in FIG. 13, and $K_1^{(3)}=2$ in FIG. 16) which estimates and tracks the parameters, and provides the estimated information bits of the first signal pair. The whole process can be repeated several iterations in the same manner.

In the specific embodiment constructed around the frequency grid of FIG. 3b, or the specific embodiment constructed around the frequency grid of FIG. 7, the detection and tracking unit 902 is constructed according to the following. The communication apparatus is configured such that the division into signal clusters is done on the basis of the relative power levels of all the active signals. On the first iteration cycle, all active signals whose estimated power levels 1015 are larger than their neighbors by a certain factor are processed separately in a one-signal cluster processor 1304a, 1304b, etc. (i.e., $M^{(1)}$=number of processed signals on the first iteration, and $K_m$ (1)=1 for m=1, ... $M^{(1)}$), while all other active signals are not processed at this iteration cycle. Each cluster processor 1304a, 1304b, etc. detects the information bits of the corresponding active signal, and tracks its parameters. The detected information bits 1302a, 1302b, etc. and the estimated parameters 1303a, 1303b, etc. are fed back to the signal separator unit 1301 where these signals are reconstructed 1502 and subtracted from the input signal 1001. The remaining active signals in the subtracted signal are divided into several clusters according to their carrier frequencies. Closely spaced signals may be grouped into one cluster, where the number of signals in each cluster can be arbitrary. The various clusters are processed in different cluster processors 1304a, 1304b, etc., configured according to the number of active signals in the corresponding signal cluster. The detected information bits 1302a, 1302b, etc., and parameter estimates 1303a, 1303b, etc., are fed back to the signal separator unit 1301, and the whole process can be repeated several iterations, with possibly different grouping of signals into clusters on each iteration cycle.

Figure 14:
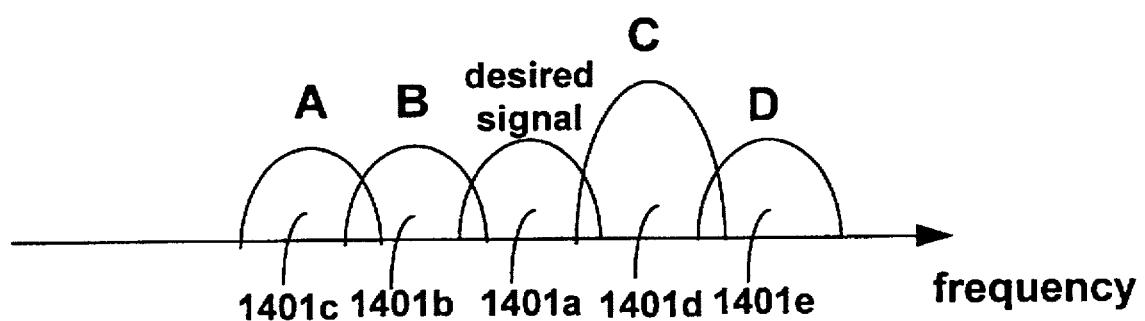
FIG. 14 shows a specific scenario that is used to explain the operation of the demodulator in the specific embodiment.

Note that the cluster configuration may be changed from one pass over the cluster processing stage 1304a, 1304b, 1304c, etc. to another. For example, consider the scenario in which there are 5 active signals, which are the desired signal 1401a, its two left hand neighboring signals 1401b and 1401c, and its two right hand neighboring signals 1401d and 1401e, as depicted in FIG. 14. Suppose that the power level of signal C 1401*d* is higher than the other signals by a certain factor, while the desired signal 1401*a* and signal A 1401*c*, signal B 1401*b* and signal D 1401*e* have approximately the same power levels. Then on the first cycle, signal C 1401*d* is detected and its parameters are tracked. Referring back to FIG. 13, the reconstructed signal C is subtracted from the input signal 1001 at the signal separator unit. Then signal A 1401*c*, signal B1401*b*, and the desired signal 1401*a* are fed to one cluster, while signal D 1401*e* is fed to another cluster. The cluster with the triple signal may be further divided into sub-clusters and sub-cluster processors and sub-signal separator, and may be iterated several times through the sub-signal separator and the sub-cluster processors, before one proceeds with the reconstruction of the whole cluster, and its subtraction from the input signal 1001 at the main signal separator 1301. Signal D 1401*e* is detected at its cluster processor, and is fed back to the main signal separator unit 1301. After the reconstruction of signal A, signal B, the desired signal, and signal D, one may repeat the whole process several times in the same or different manner (that is, the number of clusters and/or the number of sub-iterations may be different, etc.).

Figure 15:
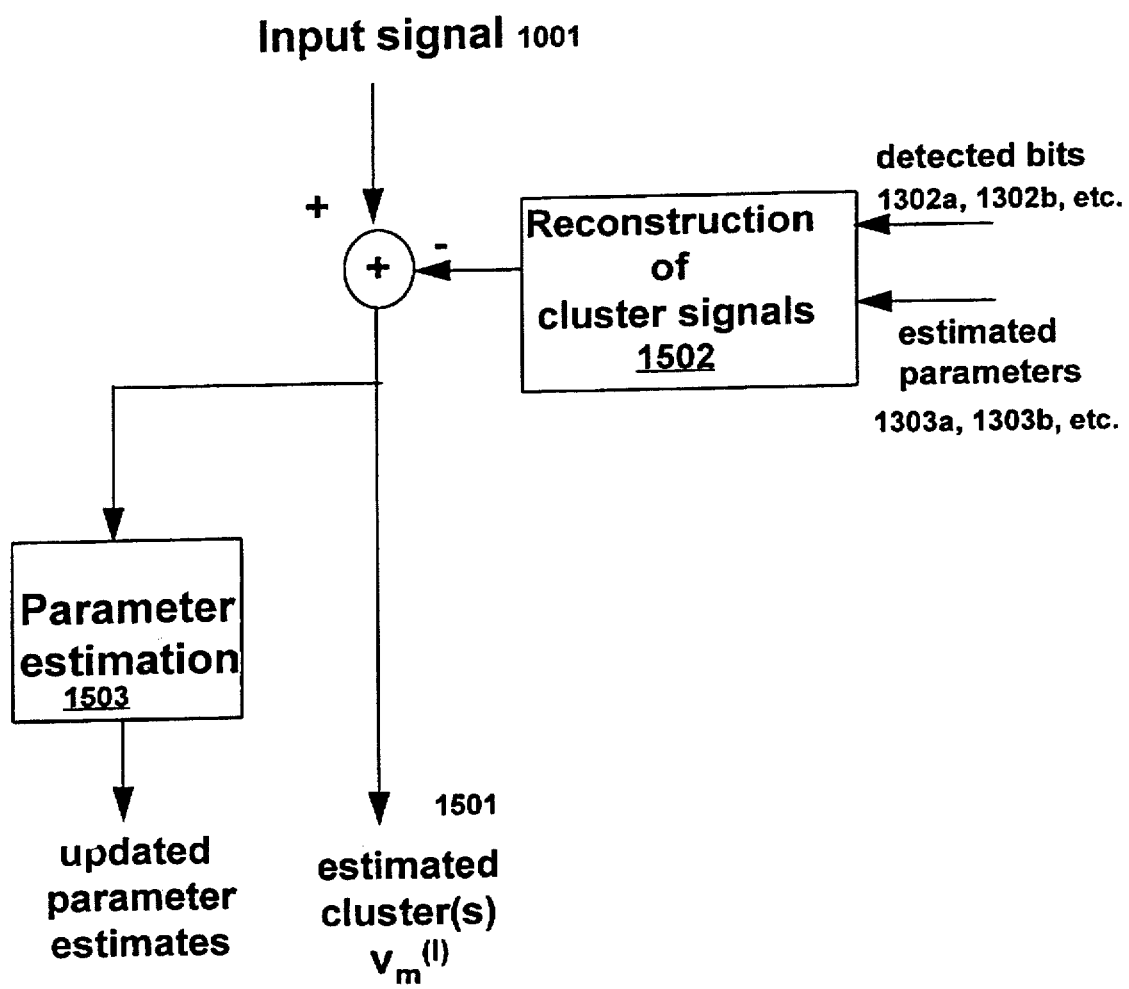
FIG. 15 illustrates the operation of the signal separator sub-unit, FIG. 16 gives the structure of a cluster processor sub-unit.

The structure of the signal separator unit 1301 is shown in FIG. 15. The operation of the signal separator is governed by the following equations:

$$v_m^{(l)}(t) = s_m(t; \hat{\underline{\theta}}_m^{(l)}) + \beta_m \left[ y(t) - \sum_{j=1}^{M^{(l)}} s_j(t; \hat{\underline{\theta}}_j^{(l)}) \right]$$

$$m = 1, \ldots M^{(l)}$$

where $v_m^{(l)}(t)$ is the input 1501 to the $m^{th}$ cluster processor after the $l^{th}$ iteration;

$M^{(l)}$ is the number of signal clusters after the $l^{th}$ iteration;

$s_j(t;\hat{\underline{\theta}}_j^{(l)})$

1502 is the reconstruction of the $j^{th}$ signal cluster after the $l^{th}$ iteration using the updated parameter estimate $\hat{\underline{\theta}}_j^{(l)}$ 1303*a*, 1303*b*, etc., and the detected bits 1302*a*, 1302*b*, etc. of all the signals that are contained in the $j^{th}$ cluster;

where $j=1, \ldots M^{(l)}$;

y(t) is the input signal 1001 to the signal separator;

and $0 \le \beta_m \le 1$ with $m=1, \ldots M^{(l)}$ are arbitrary real-valued scalars, whose values can be changed from one iteration to another.

Based on the estimated signals $v_m^{(l)}(t)$ an improved estimate 1503 of the cluster parameters can be obtained.

Figure 16:
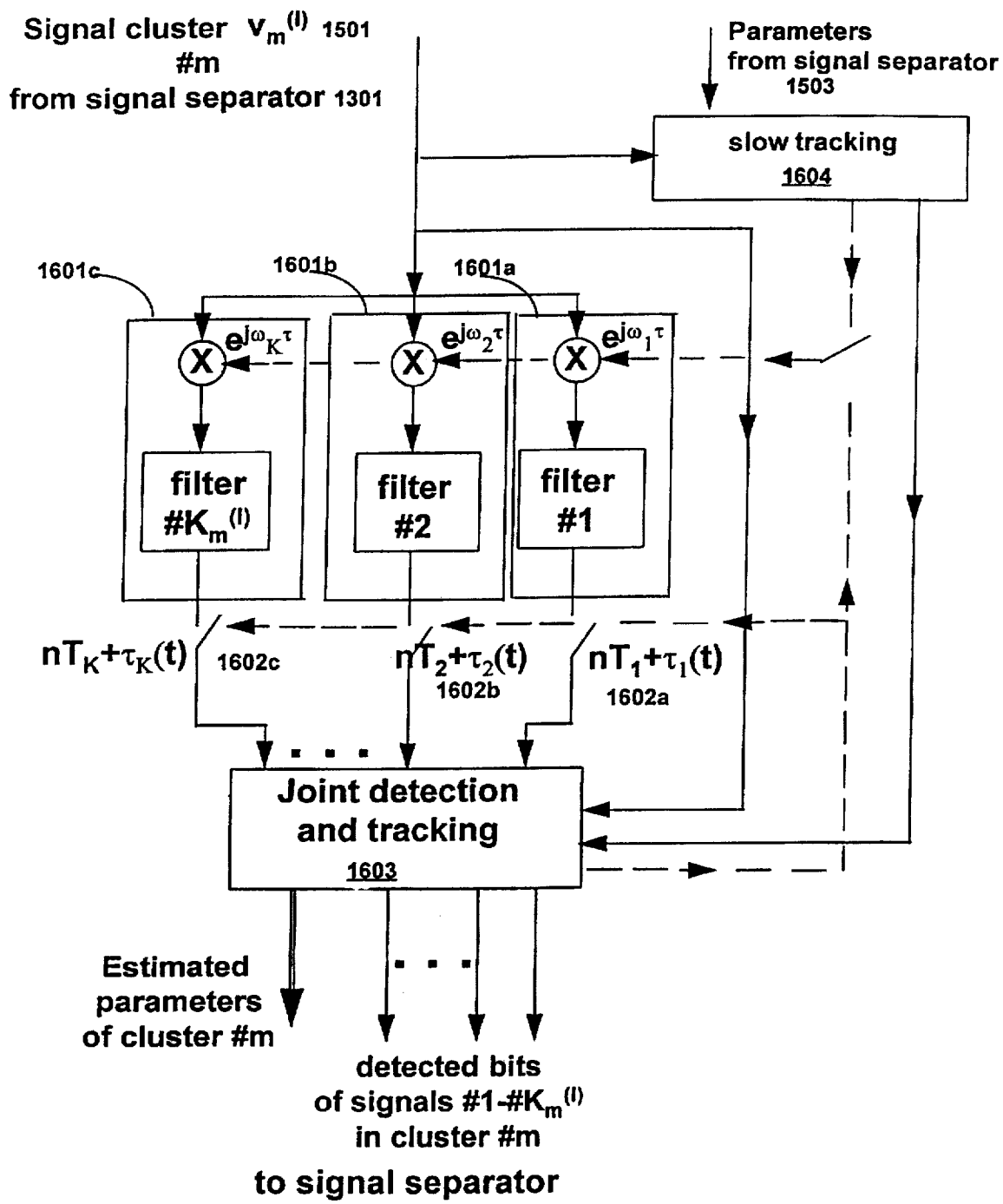

The structure of a cluster processor is given in FIG. 16. It consists of baseband conversion traits 1601*a*, 1601*b*, 1601*c*, etc, resampling of A/D units 1602*a*, 1602*b*, 1602*c*, etc., detection and tracking units 1603, and a separate slow tracking unit 1604.

Figure 17:
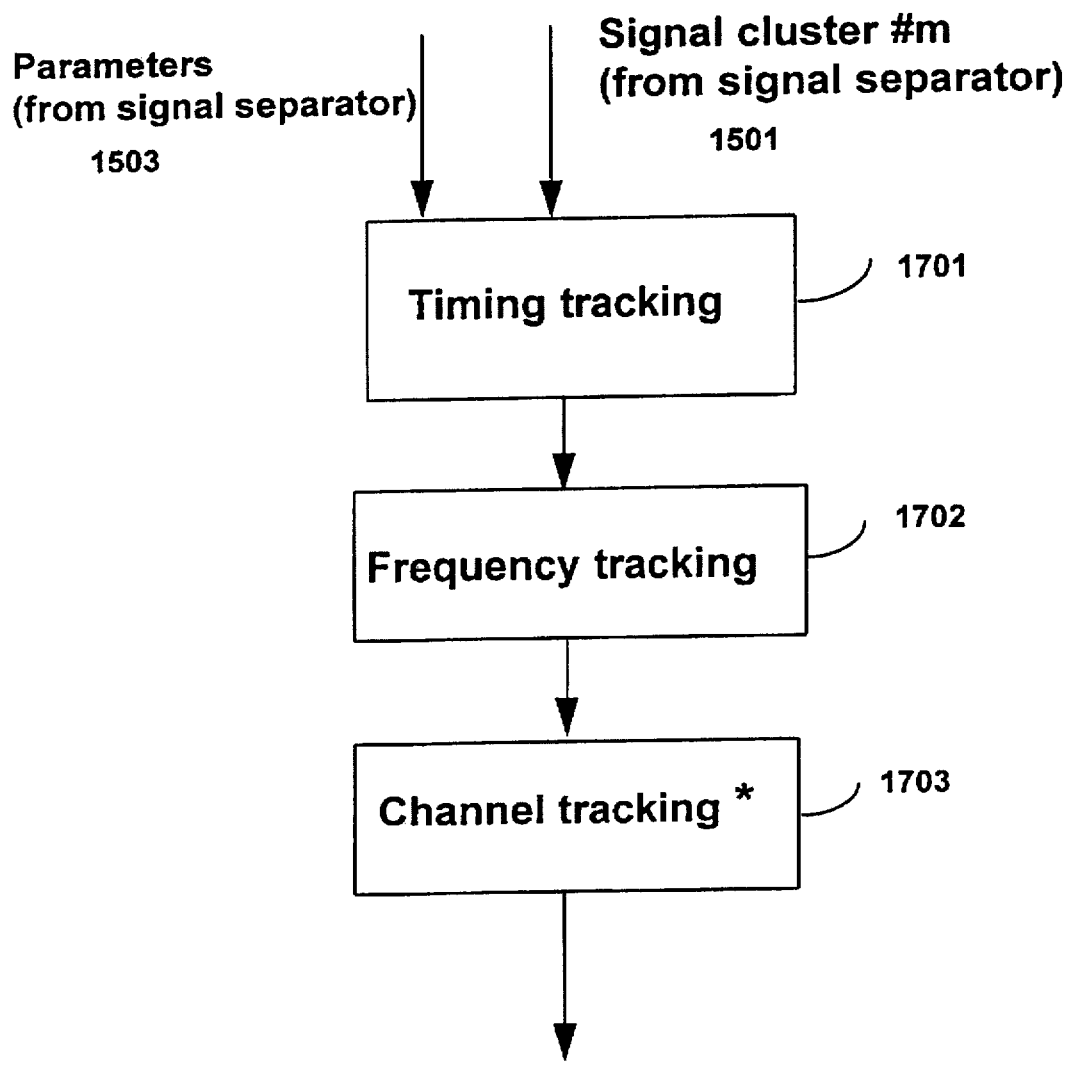
FIG. 17 illustrates the slow tracking process of slow time-varying parameters.

FIG. 17 illustrates the slow tracking unit 1604. This unit tracks the slowly time-varying parameters (e.g. frequency offset due to Doppler effects, or channel impulse response variation). The tracking algorithm is implemented once at each TDMA block (also can be implemented once in N symbols in FDMA continuous operation). The algorithm can utilize both a known sequence of bits (training sequence) or detected bits (in a decision directed mode). In the specific embodiment constructed around the IS-54 system, we assume the case of a known training sequence. In this case the slow tracking 1604 is implemented first and outputs the updated parameters to the joint detection and tracking unit 1603 (see FIG. 18). In the case of decision directed operation, several iterations between the joint detection and tracking unit 1603 and the slow tracking unit 1604 may be needed. The joint detection and tracking unit 1603 will first detect the data bits of the signals. The slow tracking unit 1604 will track the parameters and will feed the updated parameters back to the detection unit 1603.

The sequence of operations in the slow tracking unit 1604 include timing tracking 1701, frequency tracking 1702, and channel tracking 1703. The channel tracking is operative for slowly varying channels. The various tracking procedures can be done using fast-order or second-order tracking loops.

Alternate Applications

The present communication system is flexible in its implementation to encompass many variations without departing from the spirit and scope of the present claimed invention. For example, the channel allocators may be operative to allocate partially overlapping frequency bands to different users within different cells or micro-cells. In a satellite-based cellular communication system, the channel allocators are operative to allocate partially overlapping frequency bands to different users via two or more satellites and may allocate partially overlapping frequency bands to different users within different cells.

The present invention is adaptable to existing cellular systems. For example, in a the wireless cellular radio transmission system may be upgraded by upgrading channel allocation from existing cellular transmission standards (e.g., IS-54 and/or GSM standards) by reducing the channel spacing between adjacent channels. Or by adding a second base station to a specific cell that uses a set of frequencies that are partially overlapped with the frequency bands of the fast base station. These upgrade scenarios will enable a reduction in transmitting power of the mobile unit and/or the hand held terminal, and yet maintain the same performance level or better. This reduction in transmit power my be accomplished by employing a non-linear amplifier without degrading system performance.

Other advantages of the present invention are the employment of antenna diversity at the transmitter and/or at the receiver. The symbol-clocks of the different signals can be synchronized to maintain a pre-specified clock phase between the signals. The transmitted signals may be encoded independently by e.g., a convolutional code, and then interleaved with different interleaving arrays for different signals. The signals may be encoded jointly according to the chain: input bit stream→encoder→splitter→modulator(s), where the encoder may be a convolutional coding scheme, the splitter splits the output of the encoder between the different modulators, and where each modulator transmits a digital communication signal. Using encoding diversity such as this, the receiver would employ a predetection scheme to identify the modulation format of the interfering signals.

In an alternate embodiment, the present invention can be implemented according to the general scheme in FIGS. 9–13, and FIGS. 15–18, which is capable of detecting the information bits of the desired channel(s) in the presence of a digital communication interfering signal(s), where the desired signal(s) and the interfering signal(s) are partially overlapped in frequency. In this embodiment, the present invention comprises a DSP unit that further comprises a signal separator unit, and a cluster processor unit according to FIG. 13, 15, and 16, where each cluster processor may be further comprises a sub-signal separator unit, and sub-cluster processor units. The invention is also capable of exploiting different coding schemes such as a block code or a convolutional code or a Trellis code of the desired signal(s) as well as the interfering signal(s), if available. If needed, the present invention is also capable of combating various types of channel fading such as slow and fast Rayleigh fading, slow and fast Rician fading, flat or frequency-selective fading. Also if needed, the present invention is also capable of combating transmitter, receiver and channel nonlinearities, such as hard-limiting in the transmitter. This embodiment may use many modulation techniques in which the desired signals(s) and the interfering signals are Quadrature Amplitude Modulation (QAM) signals, offset-QPSK signals, π/4-QPSK signals, continuous phase modulation (CPM) signals, multi-tone signals, or a combination of the above signals. The present invention also allows an increase in bandwidth of existing channels to increase the data throughput per user without increasing the total bandwidth or the number of channels in the system.

The present invention may be implemented in various combinations of hardware and software. For example, most of the algorithm descriptions in flow charts are implemented as processes or software modules operating within a processor. For example, the cluster processors are software modules which can operate relatively independent of one another. Those skilled in the art will readily recognize the present invention may be implemented completely in hardware, firmware, software or combinations of the three without departing from the spirit and scope of the present invention.

Conclusion

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, although a speech decoder is described in the preferred embodiment, the present invention is also intended to operate to produce digital data as an output such as in the case of a digital cellular network for computers. Also, although the IS-54 standard is described throughout the specification as the standard to which the present invention has been adapted, those skilled in the art will readily recognize the application of the present invention to non-cellular communication environments where overlapping signals are used to increase bandwidth utilization. These types of environments may be satellite communications, wired or wireless applications and underwater communications media. Therefore, it is manifestly intended that this invention be limited only by the claims and the equivalents thereof.

We claim:

1. A communication system, comprising:
  a plurality of modulators each receiving one or more digital communication signals having information bits, each of the modulators operative to transmit over the same transmission medium using at least one of a given set of frequency bands;
  a channel allocator connected to the plurality of modulators and operative to allocate the frequency bands to be partially overlapping;
  a receiver having a receiving transducer and which is capable of detecting the information bits of one or more desired digital communication signals from each of the overlapping frequency bands in the presence of adjacent channel interference, the receiver comprising:
    a demodulator including a down convertor and an analog to digital convertor for producing a digital version of the set of overlapping frequency bands;
    a processor unit connected to the demodulator for receiving the digital version of the set of overlapping frequency bands and for detecting the information bits of the one or more desired digital communication signals, the processor unit further includes:
      spectral estimation process initially determining timing, frequency and power level parameter estimations of the digital version of each of the overlapping frequency bands;
      initialization process receiving the parameter estimations, determining the sequence in which the digital version of each of the overlapping frequency bands is processed, and dividing the one or more desired digital communication signals and the adjacent channel interference into clusters of closely spaced signals;
      signal separator process receiving the parameter estimations and subtracting reconstructed adjacent clusters of closely spaced signals from the digital version of the set of overlapping frequency bands; and
      detection and reconstruction process detecting the information bits from the clusters of closely spaced signals and producing therefrom each of the plurality of the digital communication signals.

2. The communication system according to claim 1 wherein the processor unit further include means for decoding a digital coding scheme comprised of the group consisting of at least one of a block code, a convolutional code, a Trellis code of desired signal as well as interfering signals.

3. The communication system according to claim 1 wherein the processor unit further includes means for combating various types of channel fading comprised of the group consisting of at least one of slow Rayleigh fading, fast Rayleigh fading, slow Rician fading, fast Rician fading, flat fading or frequency-selective fading.

4. The communication system according to claim 1 wherein the plurality of modulators modulate the plurality of digital communication signals using one of the modulation types selected from the group consisting of at least one of Quadrature Amplitude Modulation (QAM) signals, offset-QPSK signals, π/4-QPSK signals, continuous phase modulation (CPM) signals, or multi-tone signals.

5. The communication system according to claim 1 in which the channel allocator is operative to allocate frequency bands to the digital communication signals where the frequency spacings between the channels are selected such that there is only one dominant adjacent channel interference over the given set of frequency bands.

6. The communication system according to claim 1 in which the channel allocator is operative to allocate frequency bands to the digital communication signals where the frequency spacings $\Delta F_1$, $\Delta F_2$, and $\Delta F_3$ are selected such that $\Delta F_1 < \Delta F_2 < \Delta F_3$ wherein there are two pairs of channels over the given set of frequency bands such that the channels in the two pairs are overlapping.

7. The communication system according to claim 1 in which the channel allocator is operative to allocate frequency band& to the digital communication signals where the frequency spacing between the channels is such that there are at least two dominant adjacent channel interferences over the given set of frequency bands.

8. The communication apparatus according to claim 5 where the processor unit operates to execute the following operations:
  a.) in a first iteration,
    feeding, on the first iteration cycle, the digital version of each of the overlapping frequency bands into a single two-signal cluster processor;
    estimating and tracking the variations in the estimation parameters of both the desired signal and the dominant adjacent channel interference;
    detecting the information bits of a desired signal by jointly detecting the information bits of the desired signal and the information bits of the dominant adjacent channel interference; and b.) in a subsequent iteration, reconstructing an interfering signal using the detected information bits and the estimated parameters of the interfering signal from the first iteration cycle;

subtracting the reconstructed interfering signal from the input signal to produce a subtracted signal;

allocating the subtracted signal to a single one-signal cluster processor to re-detect the information bits of the desired signal, and to re-estimate the estimation parameters;

reconstructing a desired signal using the detected information bits and the estimated parameters of the desired signal from the current iteration cycle;

subtracting the reconstructed desired signal from the input signal to produce a subtracted signal;

allocating the subtracted signal to a single one-signal cluster processor to re-detect the information bits of the interfering signal, and to re-estimate the estimation parameters;

c.) repeating the subsequent iteration of step b.) until the information bits of the desired signal are reconstructed to a predetermined minimum threshold level.

9. The communication apparatus according to claim 6 where the processor unit operates to execute the following operations:

a.) in a first iteration, feeding, on the first iteration cycle, the digital version of each of the overlapping frequency bands into two two-signal cluster processors;

for each cluster processor, estimating and tracking the variations in the estimation parameters of both signals;

detecting the information bits of the corresponding pair of signals, each pair by the corresponding cluster processor, by jointly detecting the information bits of the pair of signals;

in a subsequent first sub-iteration, reconstructing a first signal using the current detected information bits and the current estimated parameters;

subtracting the reconstructed first signal from the corresponding cluster signal to produce a first subtracted signal;

allocating the first subtracted signal to a single one-signal sub-cluster processor to re-detect the information bits of the second signal, and to re-estimate the estimation parameters;

reconstructing the second signal using the current detected bits and the current estimated parameters from the current sub-iteration cycle;

subtracting the reconstructed second signal from the corresponding cluster signal to produce a second subtracted signal;

allocating the second subtracted signal to a single one-signal cluster processor to re-detect the information bits of the first signal, and to re-estimate the estimation parameters;

repeating the subsequent sub-iteration until the detected information bits of both signals, and the estimation parameters of both signals are reconstructed to a predetermined threshold level;

b.) in a subsequent iteration, reconstructing a first signal cluster using the detected information bits and the estimated parameters from the first iteration cycle;

subtracting the reconstructed first signal cluster signal from the input signal to produce a first subtracted cluster signal;

allocating the first subtracted signal to a single two-signal cluster processor to re-detect the information bits of the corresponding pair of signals, and to re-estimate the estimation parameters;

reconstructing a second signal cluster using the detected information bits and the estimated parameters of the second cluster signal from the current iteration cycle;

subtracting the reconstructed second signal cluster from the input signal to produce a second subtracted cluster signal;

allocating the second subtracted signal to a single two-signal cluster processor to re-detect the information bits of the second cluster signal, and to re-estimate the estimation parameters;

c.) repeating the subsequent iteration until the information bits of a desired signal is reconstructed to a predetermined threshold level.

10. The communication apparatus according to claim 7 where the processor unit operates to execute the following operations:

a.) in a first iteration, feeding, on the first iteration cycle, the digital version of a first group of the overlapping frequency bands whose power levels exceed a certain threshold; and/or are larger than their neighbors by a certain factor into several cluster processors, where each cluster processor is configured to receive a portion of the first group;

for each cluster processor, detecting the information bits of the corresponding signal cluster, by jointly detecting the information bits of all signals in the cluster; and by estimating and tracking the variations in the estimation parameters of all signals in the cluster;

b.) in a subsequent iteration, reconstructing the first group using the detected information bits and the estimated parameters of the first group from the first iteration cycle;

subtracting the reconstructed first group from the input signal to produce a first subtracted signal;

allocating the first subtracted signal to several cluster processors, where each cluster processor is configured to receive a portion of the first subtracted signal;

for each cluster processor, estimating and tracking the variations in the estimation parameters of all signals in the cluster;

detecting the information bits of the corresponding signal cluster, by jointly detecting the information bits of all signals in the cluster;

reconstructing the second group using the current detected information bits and the current estimated parameters of the second group;

subtracting the reconstructed second group from the input signal to produce a second subtracted signal;

allocating the second subtracted signal to several one-signal cluster processors, where each cluster processor is configured to receive a portion of the second subtracted signal that contains a single signal;

c.) repeating the subsequent iteration until the information bits of a desired signal is reconstructed to a predetermined threshold level.

11. The communication system according to claim 1 wherein the signals are non-linearly distorted and the signal is reconstructed at the signal separator means using an inserted exact or an inserted estimated non-linearity.

12. The communication system according to claim 1 wherein the signals are non-linearly distorted and the signal is reconstructed at the cluster processor means using an inserted exact or an inserted estimated non-linearity.

13. The communication system according to claim 1 wherein the signals are non-linearly distorted and encoded and the signal is decoded at the signal separator means after subtraction of an inserted exact or an inserted estimated non-linearity.

14. The communication system according to claim 1 wherein the signals are non-linearly distorted and encoded and the signal is decoded at the cluster processor means after subtraction of an inserted exact or an inserted estimated non-linearity.

15. The communication system according to claim 1 wherein the modulation technique used to transmit the plurality of digital communication signals over the same transmission medium using a given set of frequency bands is accomplished using one of the modulation types selected from the group consisting of at least one of FDMA (frequency division multiple access), TDMA (time division multiple access), or frequency-hopping allocation using with FDMA or TDMA.

16. The communication system according to claim 1 wherein the system is a multi-user wireless cellular communications system including a plurality of cells or micro-cells, and wherein the channel allocator in each communication system is operative to allocate partially overlapping frequency bands which is accomplished using one of the allocation types selected from the group consisting of at least one of allocating partially overlapping frequency bands to different users within a single cell, or allocating partially overlapping frequency bands to different users within neighboring cells.

17. The communication system according to claim 1 wherein the system is implemented as one of the communication system types selected from the group consisting of at least one of a multi-user wireless cellular communications system, multi-user land mobile radio communications system, multi-user satellite communication system, or cable-TV system in the up-link direction from end-user towards the head-end.

18. The communication system according to claim 1 wherein the partially overlapping bands are selected to carry a data rate that is higher than the data rate allocated per channel without increasing the number of channels or total bandwidth of the system.

19. A communication apparatus according to claim 1 wherein the processor means includes symbol clocks and wherein the symbol-clocks of the different signals are synchronized to maintain a pre-specified clock phase between the signals.

20. A communication apparatus according to claim 1 wherein the transmitted signals are encoded independently and are then interleaved with different interleaving arrays for different signals.

21. A communication apparatus according to claim 1 wherein the transmitted signals are encoded jointly according to an encoding sequence according to the following steps:
inputting a bit stream;
encoding the bit stream using an encoding scheme to produce an encoded bit stream;
splitting the encoded bit stream into a plurality of split encoded bit streams; and
separately modulating each or the plurality of split encoded bit streams.

22. A method of detecting the digital bits of at least one desired signal from a communications medium having overlapping communications channels, comprising the steps of:
a.) receiving at least one desired signal and at least one undesired interfering signal;
b.) digitizing the at least one desired signal and the at least one undesired interfering signal;
c.) determining initial parameter estimations of the at least one desired signal and the at least one undesired interfering signal;
d.) initially separating the at least one desired signal and the at least one undesired interfering signal into an estimated at least one desired signal and an estimated at least one undesired interfering signal, respectively;
e.) subtracting the estimated at least one undesired interfering signal from the at least one desired signal and the at least one undesired interfering signal to produce an updated desired signal;
f.) redetermining the parameter estimations of the updated desired signal and the spectral estimations of the undesired interfering signal;
g.) repeating steps e. and f.
wherein the step of determining initial spectral estimations further includes the steps of:
estimating the digital timing of the at least one desired signal and the at least one undesired interfering signal;
estimating the frequency of the at least one desired signal and the at least one undesired interfering signal;
estimating the complex amplitude of the at least one desired signal and the at least one undesired interfering signal; and
estimating the channel impulse response of the at least one desired signal and the at least one undesired interfering signal.

23. A communication receiver capable of detecting the information bits of each of one or more digital communication signals from a plurality of overlapping frequency bands in the presence of adjacent channel interference, the receiver comprising:
a demodulator including an analog to digital convertor producing a digital version from a set of overlapping frequency bands;
a processor unit connected to the demodulator for receiving the digital version of the set of overlapping frequency bands and for detecting the information bits of one or more desired digital communication signals, the processor unit further includes:
spectral estimator process initially determining timing, frequency and power level parameter estimations of the digital version of each of the overlapping frequency bands;
initialization process receiving the parameter estimations, determining the sequence in which the digital version of each of the overlapping frequency bands is processed, and dividing the one or more desired digital communication signals and the adjacent channel interference into clusters of closely spaced signals;
signal separator process receiving the parameter estimations and subtracting reconstructed adjacent clusters of closely spaced signals from the digital version of the set of overlapping frequency bands; and detection and reconstruction process detecting the information bits from the clusters of closely spaced signals and producing therefrom the one or more desired digital communication signals.

24. The communication system according to claim 23 wherein the processor unit further include means for decoding a digital coding scheme comprised of the group consisting of at least one of a block code, a convolutional code, a Trellis code of desired signal as well as interfering signals.

25. The communication system according to claim 23 wherein the processor unit further includes means for combating various types of channel fading comprised of the group consisting of at least one of slow Rayleigh fading, fast Rayleigh fading, slow Rician fading, fast Rician fading, flat fading or frequency-selective fading.

26. The communication system according to claim 23 wherein the plurality of modulators modulate the plurality of digital communication signals using one of the modulation types selected from the group consisting of at least one of Quadrature Amplitude Modulation (QAM) signals, offset-QPSK signals, π/4-QPSK signals, continuous phase modulation (CPM) signals, or multi-tone signals.

27. The communication system according to claim 23 in which the channel allocator is operative to allocate frequency bands to the digital communication signals where the frequency spacings between the channels are selected such that there is only one dominant adjacent channel interference over the given set of frequency bands.

28. The communication system according to claim 23 in which the channel allocator is operative to allocate frequency bands to the digital communication signals where the frequency spacings $\Delta F_1$, $\Delta F_2 2$, and $\Delta F_3$ are selected such that $\Delta F_1$, $<\Delta F_2$, $<F_3$ wherein there are two pairs of channels over the given set of frequency bands such that the channels in the two pairs are overlapping.

29. The communication system according to claim 23 in which the channel allocator is operative to allocate frequency bands to the digital communication signals where the frequency spacing between the channels is such that there are at least two dominant adjacent channel interferences over the given set of frequency bands.

30. The communication apparatus according to claim 27 where the processor unit operates to execute the following operations:

a.) in a first iteration,
feeding, on the first iteration cycle, the digital version of each of the overlapping frequency bands into a single two-signal cluster processor;
estimating and tracking the variations in the estimation parameters of both the desired signal and the dominant adjacent channel interference;
detecting the information bits of a desired signal by jointly detecting the information bits of the desired signal and the information bits of the dominant adjacent channel interference; and b.) in a subsequent iteration,
reconstructing an interfering signal using the detected information bits and the estimated parameters of the interfering signal from the first iteration cycle;
subtracting the reconstructed interfering signal from the input signal to produce a subtracted signal;
allocating the subtracted signal to a single one-signal cluster processor to re-detect the information bits of the desired signal, and to re-estimate the estimation parameters;
reconstructing a desired signal using the detected information bits and the estimated parameters of the desired signal from the current iteration cycle;
subtracting the reconstructed desired signal from the input signal to produce a subtracted signal;
allocating the subtracted signal to a single one-signal cluster processor to re-detect the information bits of the interfering signal, and to re-estimate the estimation parameters;

c.) repeating the subsequent iteration of step b.) until the information bits of the desired signal are reconstructed to a predetermined minimum threshold level.

31. The communication apparatus according to claim 28 where the processor unit operates to execute the following operations:

a.) in a first iteration,
feeding, on the first iteration cycle, the digital version of each of the overlapping frequency bands into two two-signal cluster processors;
for each cluster processor,
estimating and tracking the variations in the estimation parameters of both signals;
detecting the information bits of the corresponding pair of signals, each pair by the corresponding cluster processor, by jointly detecting the information bits of the pair of signals;
in a subsequent first sub-iteration,
reconstructing a first signal using the current detected information bits and the current estimated parameters;
subtracting the reconstructed first signal from the corresponding cluster signal to produce a first subtracted signal;
allocating the first subtracted signal to a single one-signal sub-cluster processor to re-detect the information bits of the second signal, and to re-estimate the estimation parameters;
reconstructing the second signal using the current detected bits and the current estimated parameters from the current sub-iteration cycle;
subtracting the reconstructed second signal from the corresponding cluster signal to produce a second subtracted signal;
allocating the second subtracted signal to a single one-signal cluster processor to re-detect the information bits of the first signal, and to re-estimate the estimation parameters;
repeating the subsequent sub-iteration until the detected information bits of both signals, and the estimation parameters of both signals are reconstructed to a predetermined threshold level;

b.) in a subsequent iteration,
reconstructing a first signal cluster using the detected information bits and the estimated parameters from the first iteration cycle;
subtracting the reconstructed first signal cluster signal from the input signal to produce a first subtracted cluster signal;
allocating the first subtracted signal to a single two-signal cluster processor to re-detect the information bits of the corresponding pair of signals, and to re-estimate the estimation parameters;
reconstructing a second signal cluster using the detected information bits and the estimated parameters of the second cluster signal from the current iteration cycle;
subtracting the reconstructed second signal cluster from the input signal to produce a second subtracted cluster signal;
allocating the second subtracted signal to a single two-signal cluster processor to re-detect the information bits of the second cluster signal, and to re-estimate the estimation parameters;

c.) repeating the subsequent iteration until the information bits of a desired signal is reconstructed to a predetermined threshold level.

32. The communication apparatus according to claim 29 where the processor unit operates to execute the following operations:

a.) in a first iteration,
feeding, on the first iteration cycle, the digital version of a first group of the overlapping frequency bands whose power levels exceed a certain threshold; and/or are larger than their neighbors by a certain factor into several cluster processors, where each cluster processor is configured to receive a portion of the first group;
for each cluster processor,
detecting the information bits of the corresponding signal cluster, by jointly detecting the information bits of all signals in the cluster; and by
estimating and tracking the variations in the estimation parameters of all signals in the cluster;

b.) in a subsequent iteration,
reconstructing the first group using the detected information bits and the estimated parameters of the first group from the first iteration cycle;
subtracting the reconstructed first group from the input signal to produce a first subtracted signal;
allocating the first subtracted signal to several cluster processors, where each cluster processor is configured to receive a portion of the first subtracted signal;
for each cluster processor,
estimating and tracking the variations in the estimation parameters of all signals in the cluster;
detecting the information bits of the corresponding signal cluster, by jointly detecting the information bits of all signals in the cluster;
reconstructing the second group using the current detected information bits and the current estimated parameters of the second group;
subtracting the reconstructed second group from the input signal to produce a second subtracted signal;
allocating the second subtracted signal to several one-signal cluster processors, where each cluster processor is configured to receive a portion of the second subtracted signal that contains a single signal;

c.) repeating the subsequent iteration until the information bits of a desired signal is reconstructed to a predetermined threshold level.

* * * * *

UNITED STATES PATENT AND TRADEMARK OFFICE
CERTIFICATE OF CORRECTION

PATENT NO. : 5,710,797
DATED : January 20, 1998
INVENTOR(S) : Mordechai Segal et al.

It is certified that error appears in the above-identified patent and that said Letters Patent is hereby corrected as shown below:

On title page,

At [73] Assignee, after "Processing", please insert --,--.

At Col. 12, line 53, please delete "ban&" and insert --bands--.

At Col. 17, line 30, please delete "$\Delta F_2 2$" and insert --$\Delta F_2$--

Signed and Sealed this

Sixteenth Day of June, 1998

Attest:

BRUCE LEHMAN

Attesting Officer    Commissioner of Patents and Trademarks